US012476671B2

United States Patent
Farag et al.

(10) Patent No.: US 12,476,671 B2
(45) Date of Patent: *Nov. 18, 2025

(54) CONFIGURATION OF A MULTI-BEAM DOWNLINK BASED ON TCI STATES IN A WIRELESS SYSTEM

(71) Applicant: Samsung Electronics Co., Ltd., Suwon-si (KR)

(72) Inventors: Emad N. Farag, Flanders, NJ (US); Eko Onggosanusi, Coppell, TX (US); Md. Saifur Rahman, Plano, TX (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 36 days.

This patent is subject to a terminal disclaimer.

(21) Appl. No.: 18/514,638

(22) Filed: Nov. 20, 2023

(65) Prior Publication Data

US 2024/0088977 A1 Mar. 14, 2024

Related U.S. Application Data

(63) Continuation of application No. 17/249,727, filed on Mar. 10, 2021, now Pat. No. 11,824,613.

(Continued)

(51) Int. Cl.
*H04B 7/0408* (2017.01)
*H04W 72/044* (2023.01)
(Continued)

(52) U.S. Cl.
CPC ........ *H04B 7/0408* (2013.01); *H04W 72/046* (2013.01); *H04W 72/23* (2023.01); *H04W 72/53* (2023.01)

(58) Field of Classification Search
CPC .... H04B 7/0695; H04W 72/53; H04W 72/23; H04W 72/046
See application file for complete search history.

(56) References Cited

U.S. PATENT DOCUMENTS

| 11,337,203 B2* | 5/2022 | Raghavan | H04L 5/0091 |
| 11,722,183 B2* | 8/2023 | Cao | H04W 72/23 |
| | | | 370/329 |

(Continued)

FOREIGN PATENT DOCUMENTS

| CN | 110167036 A | 8/2019 |
| CN | 110809321 A | 2/2020 |

(Continued)

OTHER PUBLICATIONS

"3rd Generation Partnership Project; Technical Specification Group Radio Access Network; NR; Physical channels and modulation (Release 16)", 3GPP TS 38.211 V16.4.0, Dec. 2020, 133 pgs.

(Continued)

*Primary Examiner* — Jael M Ulysse

(57) ABSTRACT

Methods and apparatuses for a multi-beam downlink and uplink wireless system. A method of a user equipment includes receiving configuration information for one or more transmission configuration indication (TCI) states and corresponding TCI state identifiers (IDs) and receiving one or more TCI state IDs. The method also includes determining, based on the one or more TCI state IDs, at least one of one or more first spatial domain filters for reception of one or more layers, respectively, of a downlink channel and one or more second spatial domain filters for transmission of one or more layers, respectively, of an uplink channel. The method further includes at least one of receiving the one or more layers of the downlink channel using the one or more first spatial domain filters, respectively, and transmitting the one (Continued)

or more layers of the uplink channel using the one or more second spatial domain filters, respectively.

12 Claims, 13 Drawing Sheets

Related U.S. Application Data

(60) Provisional application No. 63/003,622, filed on Apr. 1, 2020, provisional application No. 63/002,510, filed on Mar. 31, 2020, provisional application No. 63/000,351, filed on Mar. 26, 2020.

(51) Int. Cl.
*H04W 72/23* (2023.01)
*H04W 72/53* (2023.01)

(56) References Cited

U.S. PATENT DOCUMENTS

| | | | | |
|---|---|---|---|---|
| 11,824,613 | B2* | 11/2023 | Farag | H04W 72/23 |
| 11,974,270 | B2* | 4/2024 | Matsumura | H04L 5/0051 |
| 12,101,178 | B2* | 9/2024 | Matsumura | H04L 5/0053 |
| 12,185,313 | B2* | 12/2024 | Matsumura | H04L 5/0053 |
| 12,238,025 | B2* | 2/2025 | Zhang | H04L 5/0053 |
| 2018/0343653 | A1 | 11/2018 | Guo | |
| 2019/0174466 | A1 | 6/2019 | Zhang | |
| 2019/0215701 | A1 | 7/2019 | Honglei | |
| 2019/0253308 | A1 | 8/2019 | Huang | |
| 2019/0261281 | A1 | 8/2019 | Jung | |
| 2019/0281587 | A1 | 9/2019 | Zhang | |
| 2019/0306850 | A1 | 10/2019 | Zhang | |
| 2019/0306924 | A1* | 10/2019 | Zhang | H04L 5/0051 |
| 2019/0320469 | A1 | 10/2019 | Huang | |
| 2019/0349964 | A1 | 11/2019 | Liou | |
| 2019/0364561 | A1 | 11/2019 | Xiong | |
| 2020/0044797 | A1 | 2/2020 | Guo | |
| 2020/0053717 | A1 | 2/2020 | Zhou | |
| 2020/0100193 | A1 | 3/2020 | Cheng | |
| 2020/0119875 | A1 | 4/2020 | John Wilson | |
| 2020/0120656 | A1 | 4/2020 | Zhou | |
| 2020/0145172 | A1 | 5/2020 | Zhou | |
| 2020/0196351 | A1 | 6/2020 | Zhou | |
| 2020/0196383 | A1 | 6/2020 | Tsai | |
| 2020/0205150 | A1 | 6/2020 | Cheng | |
| 2020/0288479 | A1 | 9/2020 | Xi | |
| 2020/0305168 | A1 | 9/2020 | Liou | |
| 2020/0314857 | A1* | 10/2020 | Pezeshki | H04W 72/046 |
| 2020/0314860 | A1 | 10/2020 | Zhou | |
| 2020/0314881 | A1* | 10/2020 | Bagheri | H04W 72/23 |
| 2020/0351039 | A1 | 11/2020 | Zhou | |
| 2020/0351129 | A1* | 11/2020 | Kwak | H04W 76/27 |
| 2020/0351682 | A1* | 11/2020 | Cirik | H04W 76/28 |
| 2020/0351841 | A1 | 11/2020 | Cirik | |
| 2020/0351892 | A1* | 11/2020 | Yi | H04L 5/0092 |
| 2020/0359448 | A1* | 11/2020 | Takeda | H04W 80/02 |
| 2020/0396731 | A1 | 12/2020 | Venugopal | |
| 2021/0029707 | A1* | 1/2021 | Xu | H04L 5/0051 |
| 2021/0029708 | A1* | 1/2021 | Khoshnevisan | H04L 1/1864 |
| 2021/0076391 | A1 | 3/2021 | Davydov | |
| 2021/0112560 | A1* | 4/2021 | Khoshnevisan | H04B 7/088 |
| 2021/0119741 | A1 | 4/2021 | Zhou | |
| 2021/0120581 | A1 | 4/2021 | Kim | |
| 2021/0127388 | A1 | 4/2021 | Venugopal | |
| 2021/0153209 | A1 | 5/2021 | Guan | |
| 2021/0184733 | A1 | 6/2021 | Cao | |
| 2021/0184809 | A1 | 6/2021 | Zhou | |
| 2021/0185686 | A1* | 6/2021 | Bai | H04L 5/0051 |
| 2021/0185688 | A1* | 6/2021 | Venugopal | H04L 5/0023 |
| 2021/0195624 | A1 | 6/2021 | Venugopal | |
| 2021/0235455 | A1* | 7/2021 | Khoshnevisan | H04L 5/0035 |
| 2021/0258964 | A1* | 8/2021 | Khoshnevisan | H04B 7/0478 |
| 2021/0259004 | A1 | 8/2021 | Takeda | |
| 2021/0352665 | A1 | 11/2021 | Kang | |
| 2021/0385832 | A1 | 12/2021 | Zhang | |
| 2022/0060293 | A1 | 2/2022 | Matsumura | |
| 2022/0060296 | A1* | 2/2022 | Wu | H04W 72/231 |
| 2022/0104031 | A1 | 3/2022 | Matsumura | |
| 2022/0104237 | A1 | 3/2022 | Muruganathan | |
| 2022/0167378 | A1* | 5/2022 | Matsumura | H04W 72/1273 |
| 2022/0191892 | A1* | 6/2022 | Muruganathan | H04W 72/23 |
| 2022/0338235 | A1* | 10/2022 | Bagheri | H04L 5/0094 |
| 2023/0103557 | A1* | 4/2023 | Li | H04B 7/088 |
| | | | | 370/329 |

FOREIGN PATENT DOCUMENTS

| | | |
|---|---|---|
| EP | 3809779 A1 | 4/2021 |
| KR | 20190054978 A | 5/2019 |
| WO | 2019093764 A1 | 5/2019 |
| WO | 2019099659 A1 | 5/2019 |
| WO | 2020027594 A1 | 2/2020 |
| WO | 2020029725 A1 | 2/2020 |
| WO | 2020033231 A1 | 2/2020 |

OTHER PUBLICATIONS

"3rd Generation Partnership Project; Technical Specification Group Radio Access Network; NR; Multiplexing and channel coding (Release 16)", 3GPP TS 38.212 v16.4.0, Dec. 2020, 152 pgs.
"3rd Generation Partnership Project; Technical Specification Group Radio Access Network; NR; Physical layer procedures for control (Release 16)", 3GPP TS 38.213 v16.4.0, Dec. 2020, 181 pgs.
"3rd Generation Partnership Project; Technical Specification Group Radio Access Network; NR; Physical layer procedures for data (Release 16)", 3GPP TS 38.214 V16.4.0, Dec. 2020, 169 pgs.
"3rd Generation Partnership Project; Technical Specification Group Radio Access Network; NR; Medium Access Control (MAC) protocol specification (Release 16)", 3GPP TS 38.321 V16.3.0, Dec. 2020, 156 pgs.
"3rd Generation Partnership Project; Technical Specification Group Radio Access Network; NR; Radio Resource Control (RRC) protocol specification (Release 16)", 3GPP TS 38.331 v16.3.1, Jan. 2021, 932 pgs.
International Search Report of the International Searching Authority dated Jul. 1, 2021 in connection with International Application No. PCT/KR2021/003696, 3 pages.
Partial European Search Report dated Jul. 5, 2023 regarding Application No. 21775211.2, 13 pages.
Extended European Search Report dated Sep. 22, 2023 regarding Application No. 21775211.2, 17 pages.
Interdigital, Inc., "Remaining issues on beam management", 3GPP TSG RAN WG1 Meeting #92, R1-1802620, Feb. 2018, 6 pages.
Chinese National Intellectual Property Administration, Second Office Action issued Jul. 23, 2024 regarding Application No. 202180024475.2, 17 pages.
Extended European Search Report issued Jun. 4, 2024 regarding Application No. 24152719.1, 8 pages.
ZTE, "Enhancements on multi-TRP/Panel transmission", 3GPP TSG RAN WG1 #96, R1-1901634, Feb. 2019, 19 pages.
OPPO, "Enhancements on multi-TRP and multi-panel transmission", 3GPP TSG RAN WG1 #96bis, R1-1904036, Apr. 2019, 10 pages.
Chinese National Intellectual Property Administration, First Office Action issued Mar. 8, 2024 regarding Application No. 202180024475.2, 21 pages.

* cited by examiner

Beam indication message in beam indication channel/message or in DL DCI

Beam indication message in beam indication channel/message or in DL DCI

LG: Layer Group. Group of N layers.

Beam indication message in beam indication channel/message or in DL DCI

CW: Codeword

Beam indication message in beam indication channel/message or in UL DCI

SR: Spatial Relation

Beam indication message in beam indication channel/message or in UL DCI

LG: Layer Group. Group of N layers.   SR: Spatial Relation

Beam indication message in beam indication channel/message or in UL DCI

CW: Codeword   SR: Spatial Relation

CONFIGURATION OF A MULTI-BEAM DOWNLINK BASED ON TCI STATES IN A WIRELESS SYSTEM

CROSS-REFERENCE TO RELATED APPLICATIONS AND CLAIM OF PRIORITY

This application is a continuation of U.S. patent application Ser. No. 17/249,727, filed on Mar. 10, 2021, which claims priority to U.S. Provisional Patent Application No. 63/000,351, filed on Mar. 26, 2020; U.S. Provisional Patent Application No. 63/002,510, filed on Mar. 31, 2020; and U.S. Provisional Patent Application No. 63/003,622, filed on Apr. 1, 2020. The content of the above-identified patent document is incorporated herein by reference.

TECHNICAL FIELD

The present disclosure relates generally to wireless communication systems and, more specifically, the present disclosure relates to a multi-beam downlink and uplink wireless system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a multi-beam downlink and uplink wireless system.

In one embodiment, a user equipment (UE) is provided. The UE includes a transceiver configured to receive configuration information for one or more transmission configuration indication (TCI) states and corresponding TCI state identifiers (IDs), and one or more TCI state IDs. The UE also includes a processor operably connected to the transceiver. The processor is configured to determine, based on the one or more TCI state ID, at least one of one or more first spatial domain filters for reception of one or more layers, respectively, of a downlink channel and one or more second spatial domain filters for transmission of one or more layers, respectively, of an uplink channel. The transceiver is further configured to at least one of receive the one or more layers of the downlink channel using the one or more first spatial domain filters, respectively, and transmit the one or more layers of the uplink channel using the one or more second spatial domain filters, respectively.

In another embodiment, a base station (BS) is provided. The BS includes a transceiver configured to transmit configuration information for one or more TCI states and corresponding TCI state IDs. The BS also includes processor operably connected to the transceiver. The processor is configured to determine at least one of one or more first TCI states for one or more layers, respectively, of a downlink channel and one more second TCI states for one or more layers, respectively, of an uplink channel. The processor is configured to generate a number of TCI state IDs corresponding to the at least one of the one or more first TCI states and the one or more second TCI states. The transceiver is further configured to transmit the number of TCI state IDs; and at least one of transmit the one or more layers of the downlink channel using one or more first spatial domain filters, respectively, corresponding to the one or more first TCI states, respectively, and receive the one or more layers of the uplink channel using one or more second spatial domain filters, respectively, corresponding to the one or more second TCI states, respectively.

In yet another embodiment, a method of a UE is provided. The method includes receiving configuration information for one or more TCI states and corresponding TCI state IDs and receiving one or more TCI state IDs. The method also includes determining, based on the one or more TCI state IDs, at least one of one or more first spatial domain filters for reception of one or more layers, respectively, of a downlink channel and one or more second spatial domain filters for transmission of one or more layers, respectively, of an uplink channel. The method further includes at least one of receiving the one or more layers of the downlink channel using the one or more first spatial domain filters, respectively, and transmitting the one or more layers of the uplink channel using the one or more second spatial domain filters, respectively.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.4.0, "NR; Physical channels and modulation"; 3GPP TS 38.212 v16.4.0, "NR; Multiplexing and Channel coding"; 3GPP TS 38.213 v16.4.0, "NR; Physical Layer Procedures for Control"; 3GPP TS 38.214 v16.4.0, "NR; Physical Layer Procedures for Data"; 3GPP TS 38.321 v16.3.0, "NR; Medium Access Control (MAC) protocol specification"; and 3GPP TS 38.331 v16.3.1, "NR; Radio Resource Control (RRC) Protocol Specification."

Figure 1:
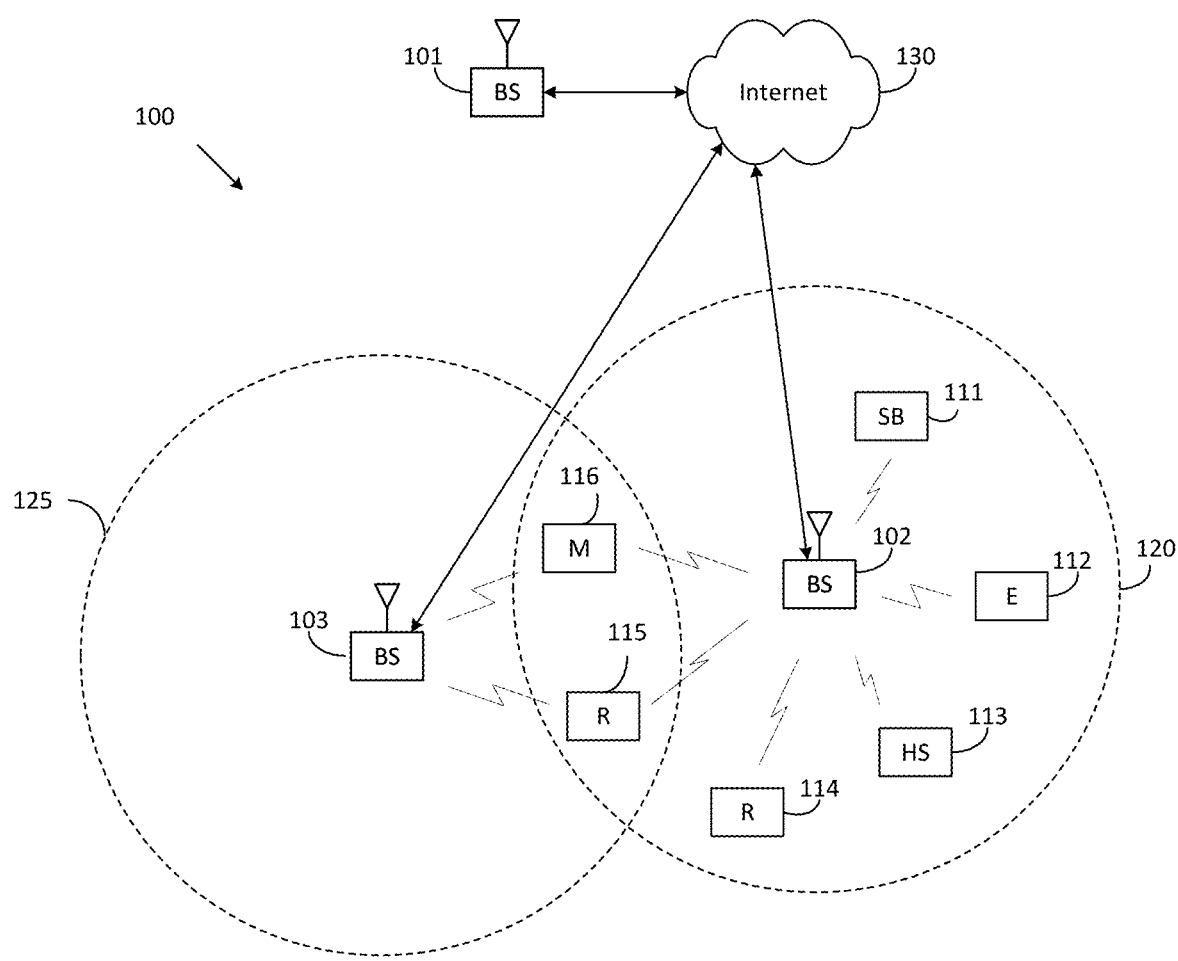
FIG. 1 illustrates an example wireless network according to embodiments of the present disclosure.
Figure 2:
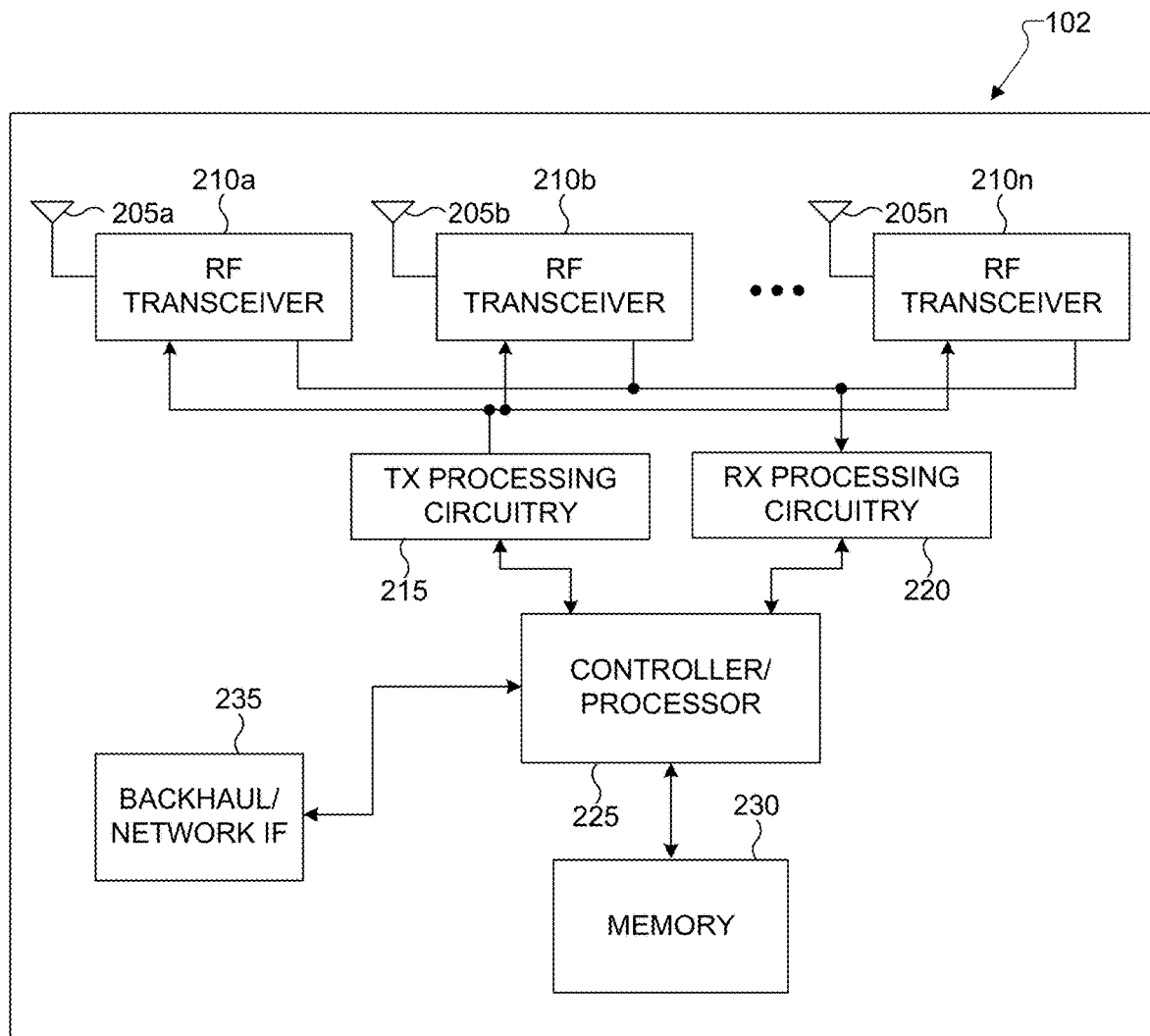
FIG. 2 illustrates an example gNB according to embodiments of the present disclosure.
Figure 3:
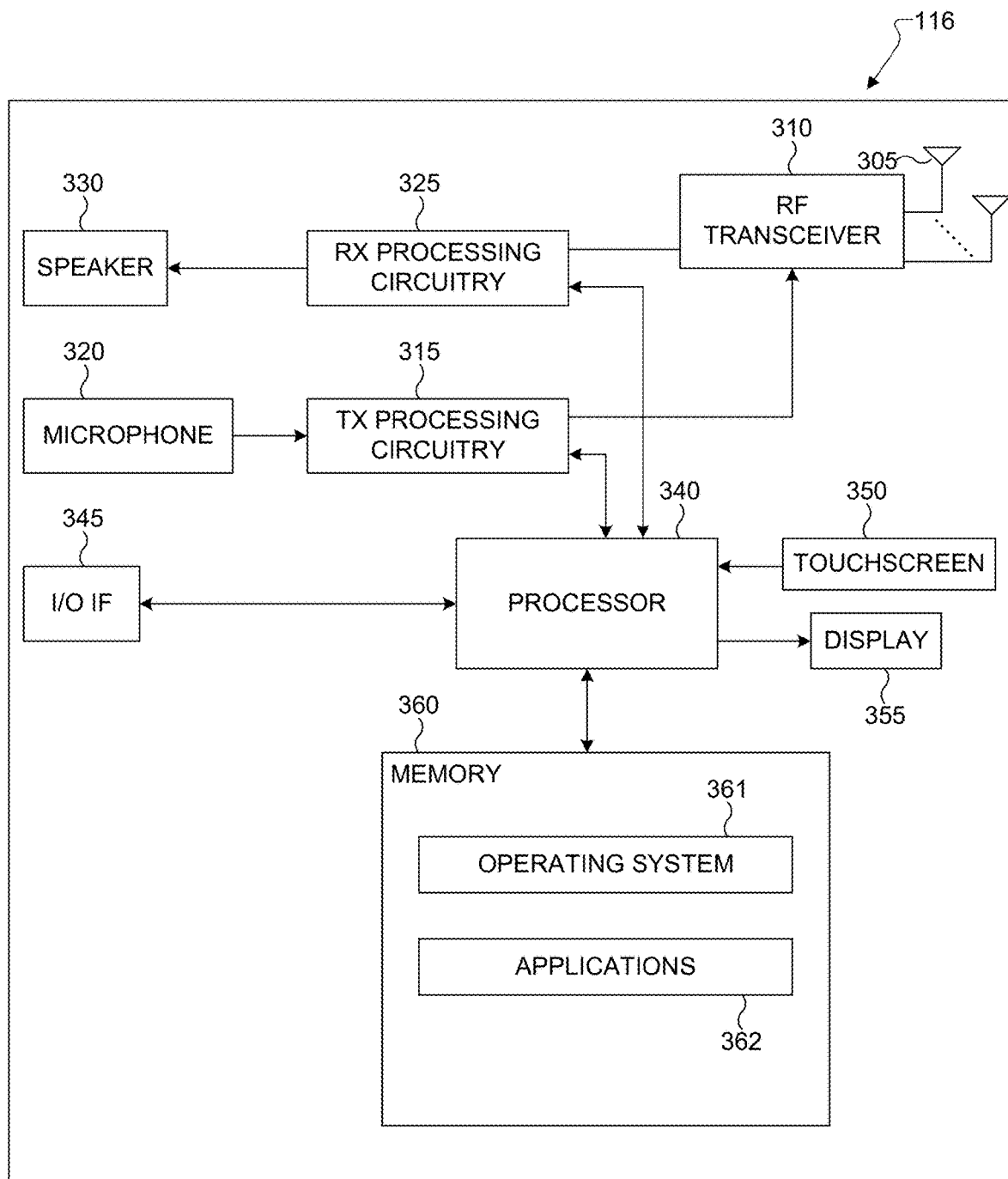
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for utilizing a multi-beam downlink and uplink wireless system. In certain embodiments, and one or more of the gNBs 101-103 includes circuitry, programing, or a combination thereof, for utilizing a multi-beam downlink and uplink wireless system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DM-RS is transmitted only in the BW of a respective PDCCH or PDSCH and a UE can use the DMRS to demodulate data or control information.

Figure 4:
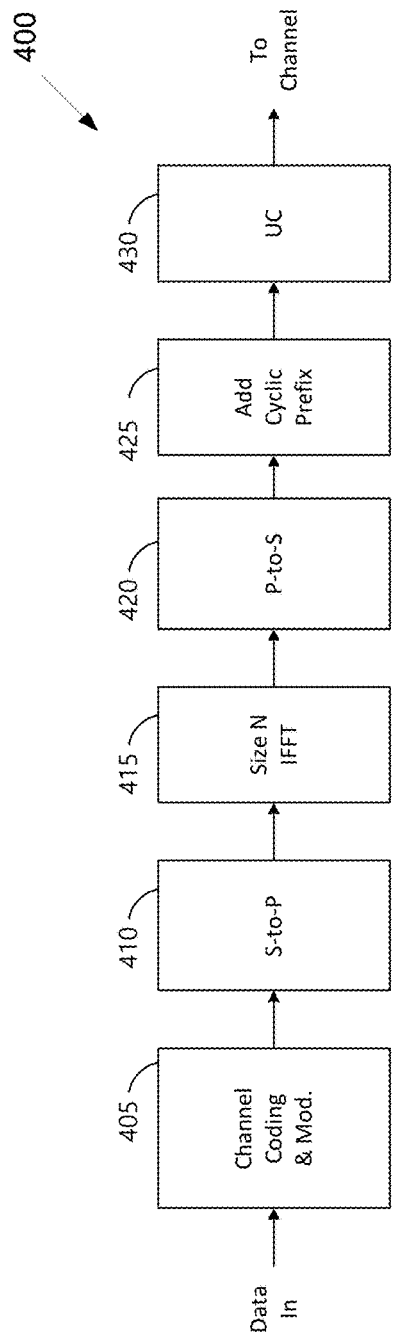
FIGS. 4 and 5 illustrate example wireless transmit and receive paths according to this disclosure.
Figure 5:
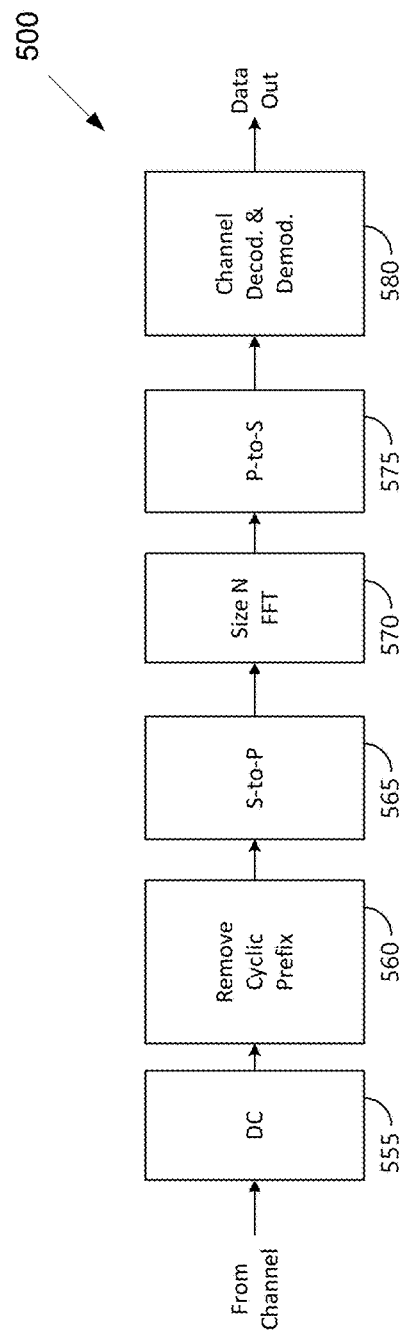

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the beam indication channel in a multi-beam system as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as demultiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNB s 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Figure 6A:
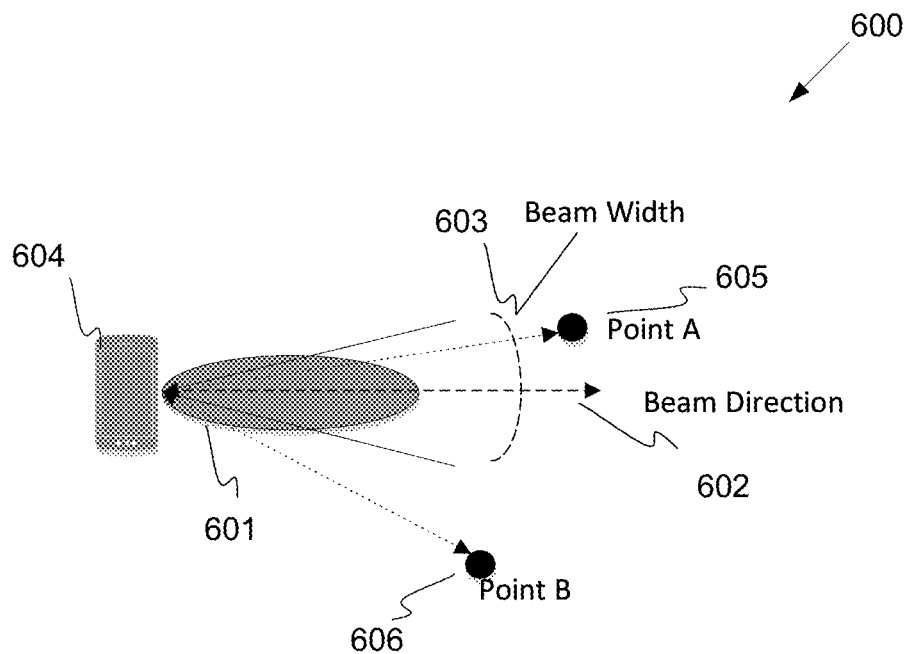
FIG. 6A illustrates an example of a beam in a wireless system according to embodiments of the present disclosure.

FIG. 6A illustrate an example of a beam in a wireless system 600 according to embodiments of the present disclosure. An embodiment of the beam shown in FIG. 6A is for illustration only.

As illustrated in FIG. 6A, in the wireless system 600, a beam 601, for a device 604, can be characterized by a beam direction 602 and a beam width 603. For example, a device 604 with a transmitter transmits RF energy in a beam direction and within a beam width. The device 604 with a receiver receives RF energy coming towards the device in a beam direction and within a beam width. As illustrated in FIG. 6A, a device at point A 605 can receive from and transmit to the device 604 as Point A is within a beam width of a beam traveling in a beam direction and coming from the device 604. A device at point B (606) cannot receive from and transmit to device (604) as Point B is outside a beam width and direction of a beam from device (604). While FIG. 6A, for illustrative purposes, shows a beam in 2-dimensions (2D), it should be apparent to those skilled in the art, that a beam can be in 3-dimensions (3D), where the beam direction and beam width are defined in space.

Figure 6B:
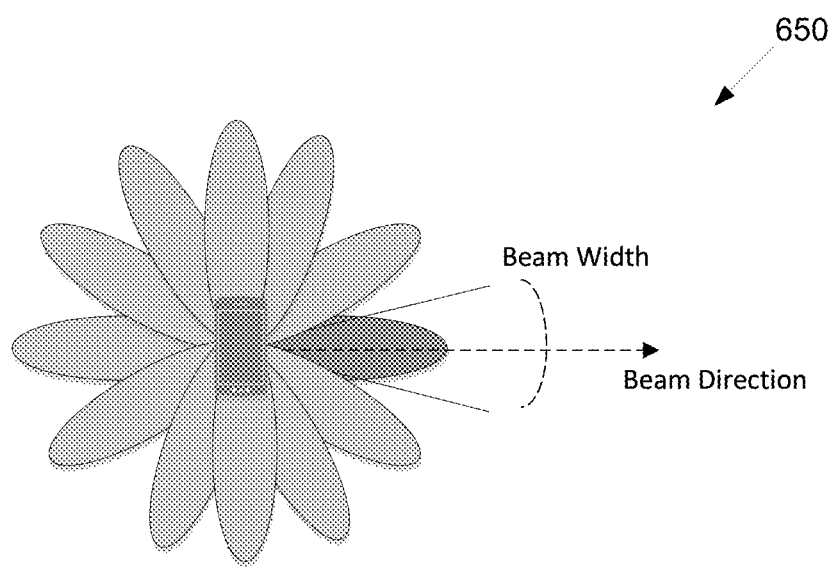
FIG. 6B illustrates an example multi-beam operation according to embodiments of the present disclosure.

FIG. 6B illustrate an example multi-beam operation 650 according to embodiments of the present disclosure. An embodiment of the multi-beam operation 650 shown in FIG. 6B is for illustration only.

In a wireless system, a device can transmit and/or receive on multiple beams. This is known as "multi-beam operation" and is illustrated in FIG. 6B. While FIG. 6B, for illustrative purposes, is in 2D, it may be apparent to those skilled in the art, that a beam can be 3D, where a beam can be transmitted to or received from any direction in space.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 7.

Figure 7:
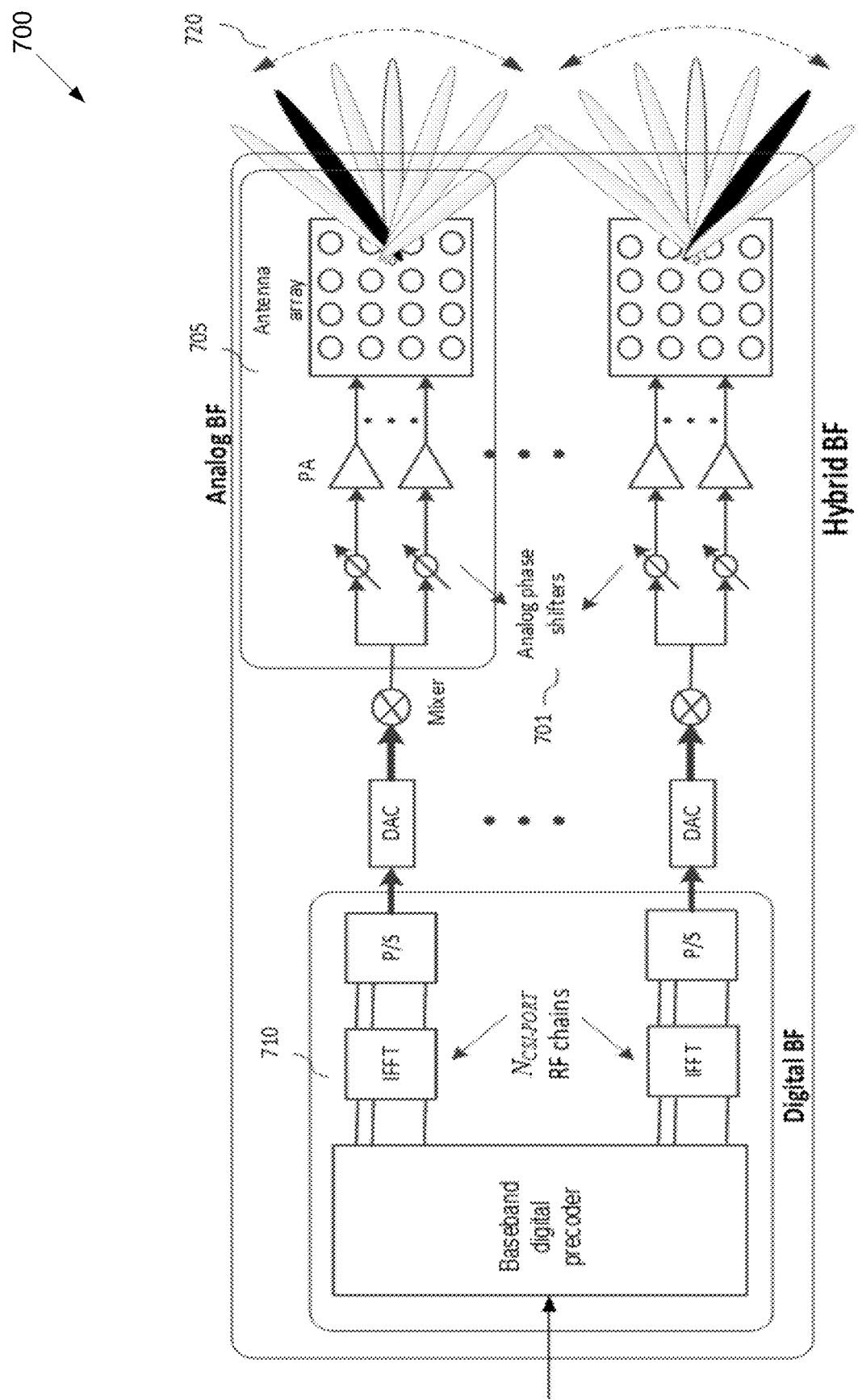
FIG. 7 illustrates an example antenna structure according to embodiments of the present disclosure.

FIG. 7 illustrates an example antenna structure 700 according to embodiments of the present disclosure. An embodiment of the antenna structure 700 shown in FIG. 7 is for illustration only. For example, the antenna structure 700 may be present in a wireless communication device, such as, for example, the UE 116 or the gNB 102 in FIG. 1.

In this case, one CSI-RS port is mapped onto a large number of antenna elements which can be controlled by a bank of analog phase shifters 701. One CSI-RS port can then correspond to one sub-array which produces a narrow analog beam through analog beamforming 705. This analog beam can be configured to sweep across a wider range of angles 720 by varying the phase shifter bank across symbols or subframes. The number of sub-arrays (equal to the number of RF chains) is the same as the number of CSI-RS ports $N_{CSI-PORT}$. A digital beamforming unit 710 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the described system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL transmit (TX) beam (also termed "beam indication"), measuring at least one reference signal for calculating and performing beam reporting (also termed "beam measurement" and "beam reporting", respectively), and receiving a DL or UL transmission via a selection of a corresponding receive (RX) beam.

The described system is also applicable to higher frequency bands such as >52.6 GHz. In this case, the system can employ only analog beams. Due to the O2 absorption loss around 60 GHz frequency (~10 dB additional loss @ 100 m distance), larger number of and sharper analog beams (hence larger number of radiators in the array) may be needed to compensate for the additional path loss.

In Rel-15 NR, multi-beam operation is designed primarily for a single TRP and a single antenna panel. Therefore, the specification supports beam indication for one TX beam wherein a TX beam is associated with a reference RS. For DL beam indication and measurement, the reference RS can be a NZP (non-zero power) CSI-RS and/or a SS/PBCH block (synchronization signal/primary broadcast channel block) or SSB for brevity, that includes a primary synchronization signal, a secondary synchronization signal, and a PBCH.

A DL beam indication is done via the transmission configuration indicator (TCI) field in a DCI format where the indication includes an index to one (and only one) assigned reference RS. A set of hypotheses, or so-called TCI states, is configured via higher-layer (e.g., RRC) signaling and, when applicable, a subset of those TCI states is selected/activated via MAC control element (CE) for the TCI field code points. For UL beam indication and measurement, the reference RS can be NZP CSI-RS, SSB, and/or SRS.

An UL beam indication is done via the SRS resource indicator (SRI) field in a DCI format where the indication is linked to one (and only one) reference RS. The link is configured via higher-layer signaling using a SpatialRelationInfo higher layer (e.g., RRC) parameter. Essentially, only one TX beam is indicated to the UE.

Furthermore, a purpose-designed DL channel for beam indication can be used by a NW/gNB to indicate to a UE a TCI state for receptions and/or a TCI-state and/or joint TCI-state for receptions and transmissions that couples DL and UL beam indications, and/or SRI for an upcoming DL channel(s) and/or UL channel(s) transmissions.

Furthermore, the beam of the beam indication channel can be designed to provide wider beam coverage than a beam coverage for data or control channels and can be additionally designed such that adjacent beams of the beam indication channel partially overlap to provide for more robust coverage in a dynamic multi-path environment.

Furthermore, for a dispersive and fast changing multi-path environment, the TCI-state of a beam indication channel can comprise of multiple beams. A gNB can transmit and a UE can receive the TCI indication channel on one or more of these beams. Furthermore, when the beam indication channel is intended to be received by a group of UEs, the TCI-state of the beam indication channel is comprised of the beams covering the group of UEs.

The present disclosure considers additional design aspects related to operation in a multi-path environment with multiple beams, wherein the 5G NR data channels in the downlink (PDSCH) and uplink (PUSCH) directions can include multiple layers, wherein the layers can be configured and assigned to different TX beams. The disclosure also considers aspects related to joint UL/DL 5G NR data channel (e.g., PDSCH/PUSCH) beam signaling, for example, in case of beam correspondence or when a number of layers of the UL and DL data channels (e.g., PDSCH/PUSCH) can be different. The disclosure further considers aspects related to joint 5G NR data/control channel (e.g., PDSCH/PDCCH or PUSCH/PUCCH) beam signaling, for example, in case the data channel is configured and assigned multiple Tx beams. The disclosure additionally considers aspects related to joint beam signaling across multiple component carriers and/or bandwidth parts (BWPs), for example when a number of layers and/or Tx beams is different for different respective component carriers/cells or BWPs of a component carrier/cell.

In the following, both frequency division duplexing (FDD) and time division duplexing (TDD) are considered as a duplex method for DL and UL signaling. Although exemplary descriptions and embodiments to follow assume orthogonal frequency division multiplexing (OFDM) or orthogonal frequency division multiple access (OFDMA), the present disclosure can be extended to other OFDM-based transmission waveforms or multiple access schemes such as filtered OFDM (F-OFDM).

The present disclosure considers several components that can be used in conjunction or in combination with one another or can operate as standalone schemes.

In the present disclosure, the term "activation" describes an operation wherein a UE receives and decodes a signal from the network (or gNB) that signifies a starting point in time. The starting point can be a present or a future slot/subframe or symbol and the exact location is either implicitly or explicitly indicated or is otherwise specified in the system operation or is configured by higher layers. Upon successfully decoding the signal, the UE responds according to an indication provided by the signal. The term "deactivation" describes an operation wherein a UE receives and decodes a signal from the network (or gNB) that signifies a stopping point in time. The stopping point can be a present or a future slot/subframe or symbol and the exact location is either implicitly or explicitly indicated or is otherwise specified in the system operation or is configured by higher layers. Upon successfully decoding the signal, the UE responds according to an indication provided by the signal.

Terminology such as TCI, TCI states, SpatialRelationInfo, target RS, reference RS, and other terms is used for illustrative purposes and is therefore not normative. Other terms that refer to same functions can also be used.

A "reference RS" corresponds to a set of characteristics of a DL beam or an UL TX beam, such as a direction, a precoding/beamforming, a number of ports, and so on. For instance, for DL, as the UE receives a reference RS index/ID, for example through a field in a DCI format, that is represented by a TCI state, the UE applies the known characteristics of the reference RS to associated DL reception. The reference RS can be received and measured by the UE (for example, the reference RS is a downlink signal such as NZP CSI-RS and/or SSB) and the UE can use the result of the measurement for calculating a beam report (in Rel-15 NR, a beam report includes at least one L1-RSRP accompanied by at least one CRI). Using the received beam report, the NW/gNB can assign a particular DL TX beam to the UE. A reference RS can also be transmitted by the UE (for example, the reference RS is an uplink signal such as SRS). As the NW/gNB receives the reference RS from the UE, the NW/gNB can measure and calculate information used to assign a particular DL TX beam to the UE. This option is applicable at least when there is DL-UL beam pair correspondence.

In another instance, for UL transmissions, a UE can receive a reference RS index/ID in a DCI format scheduling an UL transmission such as a PUSCH transmission and the UE then applies the known characteristics of the reference RS to the UL transmission. The reference RS can be received and measured by the UE (for example, the reference RS is a downlink signal such as NZP CSI-RS and/or SSB) and the UE can use the result of the measurement to calculate a beam report. The NW/gNB can use the beam report to assign a particular UL TX beam to the UE. This option is applicable at least when DL-UL beam pair correspondence holds. A reference RS can also be transmitted by the UE (for example, the reference RS is an uplink signal such as SRS or DMRS). The NW/gNB can use the received reference RS to measure and calculate information that the NW/gNB can use to assign a particular UL TX beam to the UE.

The reference RS can be triggered by the NW/gNB, for example via DCI in case of aperiodic (AP) RS or can be configured with a certain time-domain behavior, such as a periodicity and offset in case of periodic RS or can be a combination of such configuration and activation/deactivation in case of semi-persistent RS.

For mmWave bands (or frequency range 2 (FR2)) or for higher frequency bands (such as >52.6 GHz or FR4) where multi-beam operation is especially relevant, a transmission-reception process includes a receiver selecting a RX beam for a given TX beam. For DL multi-beam operation, a UE selects a DL RX beam for every DL TX beam (that corresponds to a reference RS). Therefore, when DL RS, such as CSI-RS and/or SSB, is used as reference RS, the NW/gNB transmits the DL RS to the UE for the UE to be able to select a DL RX beam.

In response, the UE measures the DL RS, and in the process selects a DL RX beam, and reports the beam metric associated with the quality of the DL RS. In this case, the UE determines the TX-RX beam pair for every configured (DL) reference RS. Therefore, although this knowledge is unavailable to the NW/gNB, the UE, upon receiving a DL RS associated with a DL TX beam indication from the NW/gNB, can select the DL RX beam from the information the UE obtains on all the TX-RX beam pairs. Conversely, when an UL RS, such as an SRS and/or a DMRS, is used as reference RS, at least when DL-UL beam correspondence or reciprocity holds, the NW/gNB triggers or configures the UE to transmit the UL RS (for DL and by reciprocity, this corresponds to a DL RX beam). The gNB, upon receiving and measuring the UL RS, can select a DL TX beam. As a result, a TX-RX beam pair is derived. The NW/gNB can perform this operation for all the configured UL RSs, either per reference RS or by "beam sweeping," and determine all TX-RX beam pairs associated with all the UL RSs configured to the UE to transmit.

The following two embodiments (A-1 and A-2) are examples of DL multi-beam operations that utilize DL-TCI-state based DL beam indication. In the first example embodiment (A-1), an aperiodic CSI-RS is transmitted by the NW/gNB and received/measured by the UE. This embodiment can be used regardless of whether or not there is UL-DL beam correspondence.

In the second example embodiment (A-2), an aperiodic SRS is triggered by the NW and transmitted by the UE so that the NW (or a gNB) can measure the UL channel quality for the purpose of assigning a DL RX beam. This embodiment can be used at least when there is UL-DL beam correspondence. Although aperiodic RS is considered in the two examples, a periodic or a semi-persistent RS can also be used.

Figure 8:
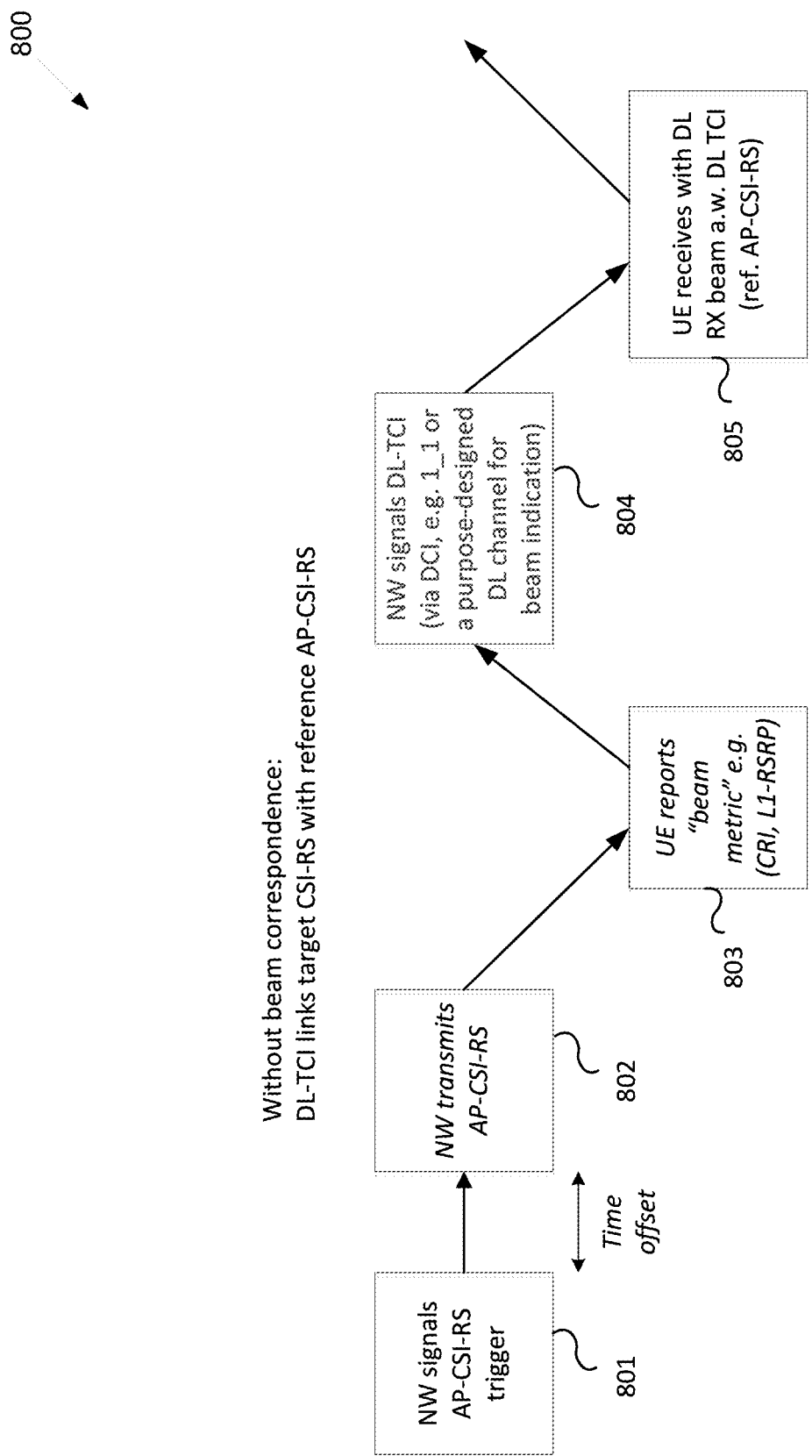
FIG. 8 illustrates an example DL multi-beam operation according to embodiments of the present disclosure.

FIG. 8 illustrates an example DL multi-beam operation 800 according to embodiments of the present disclosure. An embodiment of the UL multi-beam operation 800 shown in FIG. 8 is for illustration only.

In one example illustrated in FIG. 8 (embodiment A-1), a DL multi-beam operation 800 starts with the gNB/NW signaling to a UE an aperiodic CSI-RS (AP-CSI-RS) trigger or indication (step 801). This trigger or indication can be included in a DCI and indicate transmission of AP-CSI-RS in a same (zero time offset) or in a later slot/sub-frame (>0 time offset). For example, the DCI can be related to scheduling of a DL reception or an UL transmission and the CSI-RS trigger can be either jointly or separately coded with a CSI report trigger. Upon receiving the AP-CSI-RS transmitted by the gNB/NW (step 802), the UE measures the AP-CSI-RS and calculates and reports a "beam metric" that indicates a quality of a particular TX beam hypothesis (step 803). Examples of such beam reporting are a CSI-RS resource indicator (CRI), or a SSB resource indicator (SSB-RI), coupled with an associated layer 1-received signal received power (L1-RSRP)/L1-received signal received quality (L1-RSRQ)/L1-signal to interference ratio (L1-SINR)/channel quality indicator (CQI).

Upon receiving the beam report from the UE, the gNB/NW can use the beam report to select a DL RX beam for the UE and indicate the DL RX beam selection (step 804) using a TCI-state field in a DCI format such as a DCI format scheduling a PDSCH reception by the UE. In this case, a value of the TCI-state field indicates a reference RS, such as an AP-CSI-RS, representing the selected DL TX beam (by the gNB/NW). In addition, the TCI-state can also indicate a "target" RS, such as a. CSI-RS, that is linked to the reference RS, such as an AP-CSI-RS. Upon successfully decoding the DCI format providing the TCI-state, the UE selects an DL RX beam and performs DL reception, such as a PDSCH reception, using the DL RX beam associated with the reference CSI-RS (step 805).

Alternatively, the gNB/NW can use the beam report to select a DL RX beam for the UE and indicate to the UE the selected DL RX beam (step 804) using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a UE-specific search space (USS) while a UE-group common DL channel can be a PDCCH that a UE receives according to a common search space (CSS). In this case, the TCI-state indicates a reference RS, such as an AP-CSI-RS, representing the selected DL TX beam (by the gNB/NW). In addition, the TCI-state can also indicate a "target" RS, such as a CSI-RS, that is linked to the reference RS, such as an AP-CSI-RS. Upon successfully decoding the purpose-designed DL channel for beam indication with the TCI state, the UE selects a DL RX beam and performs DL reception, such as a PDSCH reception, using the DL RX beam associated with the reference CSI-RS (step 805).

For this embodiment (A-1), as described above, the UE selects a DL RX beam using an index of a reference RS, such as an AP-CSI-RS, that is provided via the TCI state field, for example in a DCI format. In this case, the CSI-RS resources or, in general, the DL RS resources including CSI-RS, SSB, or a combination of the two, that are configured to the UE as the reference RS resources can be linked to (associated with) a "beam metric" reporting such as CRI/L1-RSRP or L1-SINR.

Figure 9:
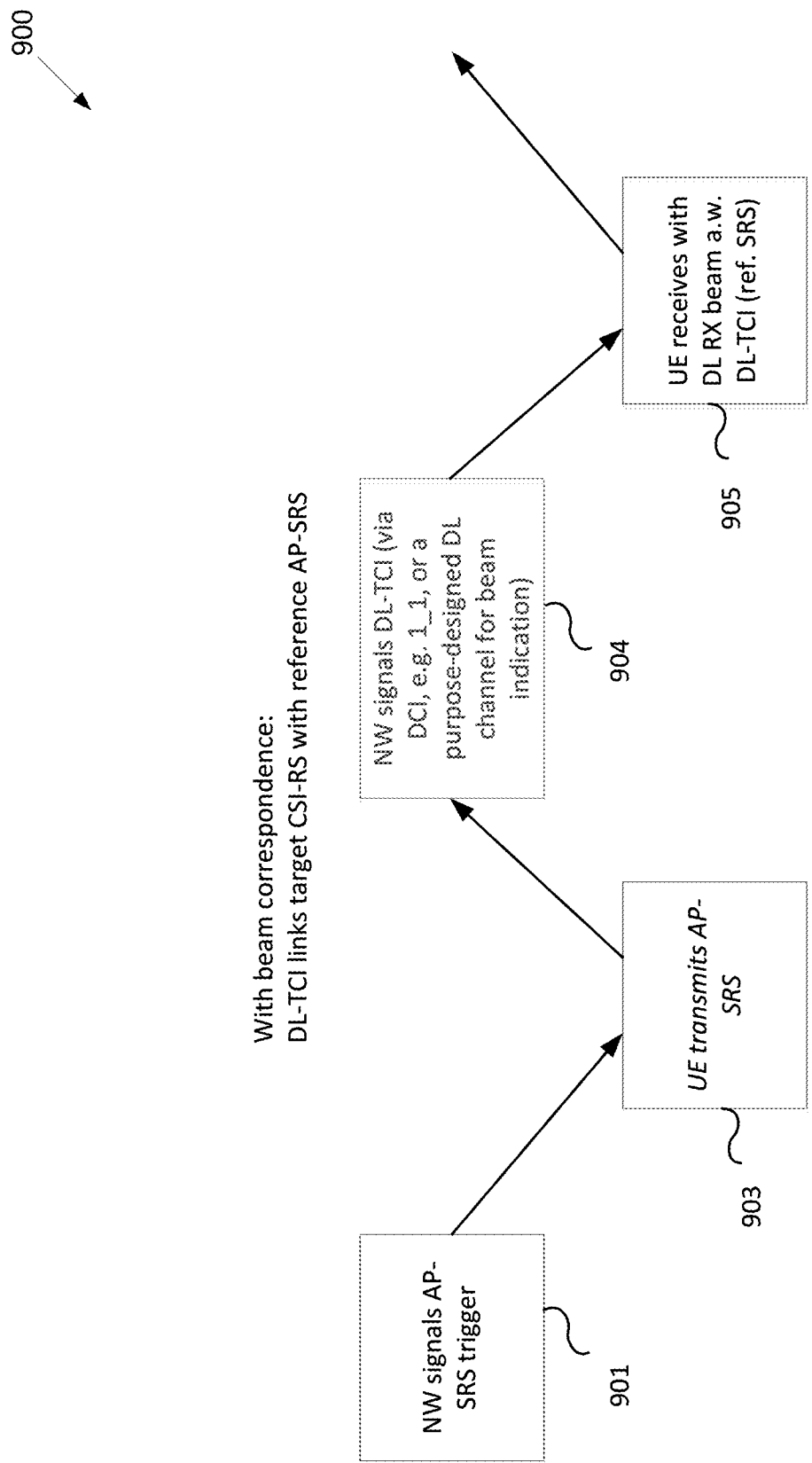
FIG. 9 illustrates another example DL multi-beam operation according to embodiments of the present disclosure.

FIG. 9 illustrates another example DL multi-beam operation 900 according to embodiments of the present disclosure. An embodiment of the UL multi-beam operation 900 shown in FIG. 9 is for illustration only.

In another example illustrated in FIG. 9 (embodiment A-2), an DL multi-beam operation 900 starts with the gNB/NW signaling to a UE an aperiodic SRS (AP-SRS) trigger or request (step 901). This trigger can be included in a DCI format such as for example a DCI format scheduling a PDSCH reception or a PUSCH transmission. Upon receiving and decoding the DCI format with the AP-SRS trigger (step 902), the UE transmits an SRS (AP-SRS) to the gNB/NW (step 903) so that the NW (or gNB) can measure the UL propagation channel and select a DL RX beam for the UE for DL (at least when there is beam correspondence).

The gNB/NW can then indicate the DL RX beam selection (step 904) through a value of a TCI-state field in a DCI format, such as a DCI format scheduling a PDSCH reception. In this case, the TCI state indicates a reference RS, such as an AP-SRS, representing the selected DL RX beam. In addition, the TCI state can also indicate a "target" RS, such as a CSI-RS, that is linked to the reference RS, such as an AP-SRS. Upon successfully decoding the DCI format providing the TCI state, the UE performs DL receptions, such as a PDSCH reception, using the DL RX beam indicated by the TCI-state (step 905).

Alternatively, the gNB/NW can indicate the DL RX beam selection (step 904) to the UE using a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the TCI-state indicates a reference RS, such as an AP-SRS, representing the selected DL RX beam. In addition, the TCI-state can also indicate a "target" RS, such as a CSI-RS, that is linked to the reference RS, such as an AP-SRS. Upon successfully decoding a purpose-designed DL channel for beam indication with the TCI-state, the UE performs DL reception, such as a PDSCH reception, with the DL RX beam indicated by the TCI-state (step 905).

For this embodiment (A-2), as described above, the UE selects the DL RX beam based on the UL TX beam associated with the reference RS (AP-SRS) index signaled via the TCI-state field.

Similar, for an UL multi-beam operation, the gNB selects an UL RX beam for every UL TX beam that corresponds to a reference RS. Therefore, when an UL RS, such as an SRS and/or a DMRS, is used as a reference RS, the NW/gNB triggers or configures the UE to transmit the UL RS that is associated with a selection of an UL TX beam. The gNB, upon receiving and measuring the UL RS, selects an UL RX beam. As a result, a TX-RX beam pair is derived. The NW/gNB can perform this operation for all the configured reference RS s, either per reference RS or by "beam sweeping," and determine all the TX-RX beam pairs associated with all the reference RS s configured to the UE.

Conversely, when a DL RS, such as a CSI-RS and/or an SSB, is used as reference RS (at least when there is DL-UL beam correspondence or reciprocity), the NW/gNB transmits the RS to the UE (for UL and by reciprocity, this RS also corresponds to an UL RX beam). In response, the UE measures the reference RS (and in the process selects an UL TX beam) and reports the beam metric associated with the quality of the reference RS. In this case, the UE determines the TX-RX beam pair for every configured (DL) reference RS. Therefore, although this information is unavailable to the NW/gNB, upon receiving a reference RS (hence an UL RX beam) indication from the NW/gNB, the UE can select the UL TX beam from the information on all the TX-RX beam pairs.

The following two embodiments (B-1 and B-2) are examples of UL multi-beam operations that utilize TCI-based UL beam indication after the network (NW) receives a transmission from the UE. In the first example embodiment (B-1), a NW transmits an aperiodic CSI-RS, and a UE receives and measures the CSI-RS. This embodiment can be used, for instance, at least when there is reciprocity between the UL and DL beam-pair-link (BPL). This condition is termed "UL-DL beam correspondence." In the second example embodiment (B-2), the NW triggers an aperiodic SRS transmission from a UE and the UE transmits the SRS so that the NW (or a gNB) can measure the UL channel quality for the purpose of assigning an UL TX beam. This embodiment can be used regardless of whether or not there is UL-DL beam correspondence. Although aperiodic RS is considered in these two examples, periodic or semi-persistent RS can also be used.

Figure 10:
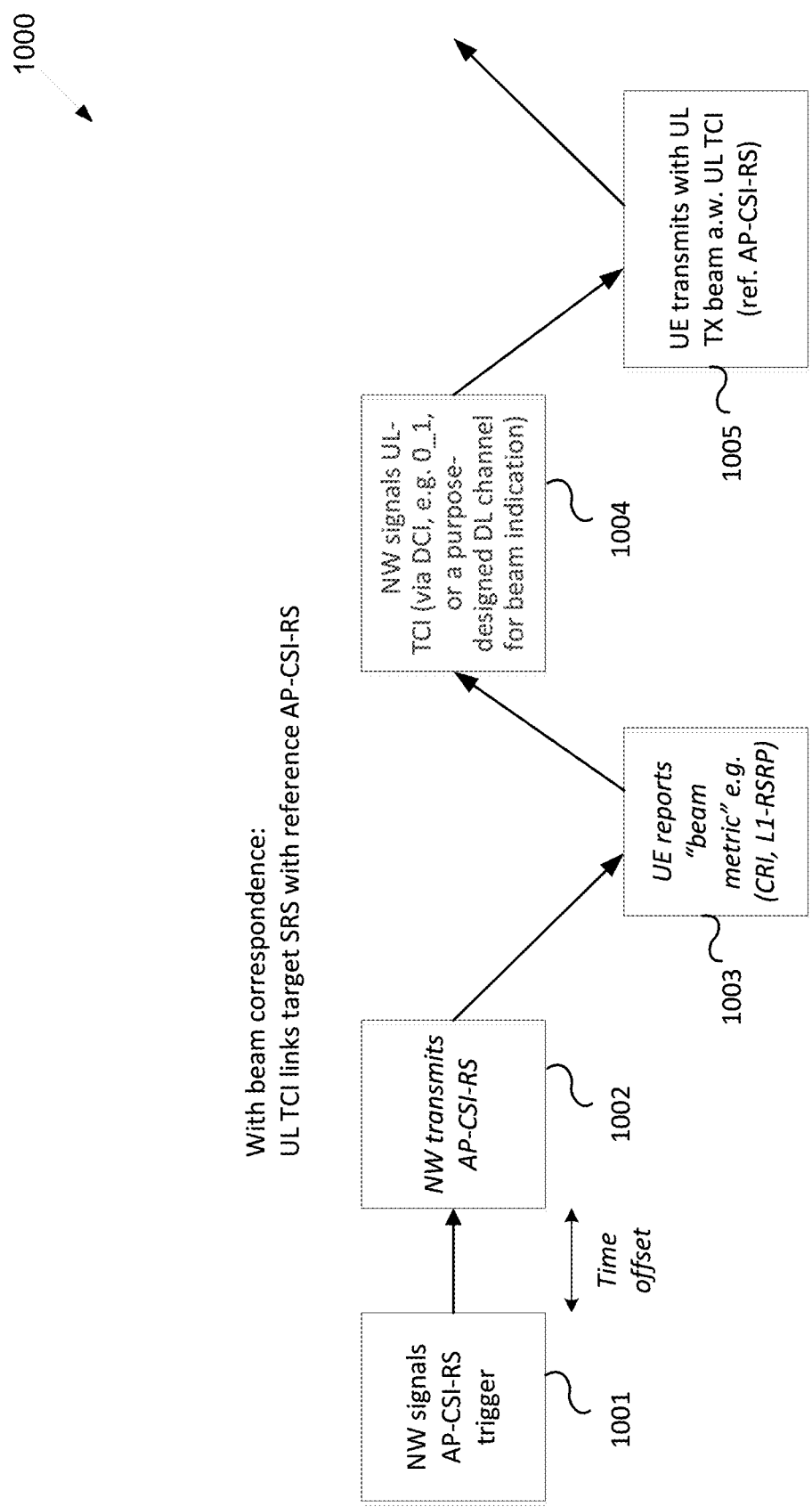
FIG. 10 illustrates an example UL multi-beam operation according to embodiments of the present disclosure.

FIG. 10 illustrates an example UL multi-beam operation 1000 according to embodiments of the present disclosure. An embodiment of the UL multi-beam operation 1000 shown in FIG. 10 is for illustration only.

In one example illustrated in FIG. 10 (embodiment B-1), an UL multi-beam operation 1000 starts with the gNB/NW signaling to a UE an aperiodic CSI-RS (AP-CSI-RS) trigger or indication (step 1001). This trigger or indication can be included in a DCI format, such as a DCI format scheduling a PDSCH reception to the UE or a PUSCH transmission from the UE and can be either separately or jointly signaled with an aperiodic CSI request/trigger and indicate transmission of AP-CSI-RS in a same slot (zero time offset) or in a later slot/sub-frame (>0 time offset). Upon receiving the AP-CSI-RS transmitted by the gNB/NW (step 1002), the UE measures the AP-CSI-RS and, in turn, calculates and reports a "beam metric" (indicating quality of a particular TX beam hypothesis) (step 1003). Examples of such beam reporting are CRI or SSB-RI together with an associated L1-RSRP/L1-RSRQ/L1-SINR/CQI.

Upon receiving the beam report from the UE, the gNB/NW can use the beam report to select an UL TX beam for the UE and indicate the UL TX beam selection (step 1004) using a TCI-state field in a DCI format, such as a DCI format scheduling a PUSCH transmission from the UE. The TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding the DCI format indicating the TCI-state, the UE selects an UL TX beam and performs UL transmission, such as a PUSCH transmission, using the UL TX beam associated with the reference CSI-RS (step 1005).

Alternatively, the gNB/NW can use the beam report to select an UL TX beam for the UE and indicate the UL TX beam selection (step 1004) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the TCI-state indicates a reference RS, such as an AP-CSI-RS, representing the selected UL RX beam (by the gNB/NW). In addition, the TCI-state can also indicate a "target" RS, such as a SRS, that is linked to the reference RS, such as an AP-CSI-RS. Upon successfully decoding a purpose-designed DL channel providing a beam indication by the TCI-state, the UE selects an UL TX beam and performs UL transmission, such as a PUSCH transmission, using the UL TX beam associated with the reference CSI-RS (step 1005).

For this embodiment (B-1), as described above, the UE selects the UL TX beam based on the derived DL RX beam associated with the reference RS index signaled via the value of the TCI-state field. In this case, the CSI-RS resources or, in general, the DL RS resources including CSI-RS, SSB, or a combination of the two, that are configured for the UE as the reference RS resources can be linked to (associated with) "beam metric" reporting such as CRI/L1-RSRP or L1-SINR.

Figure 11:
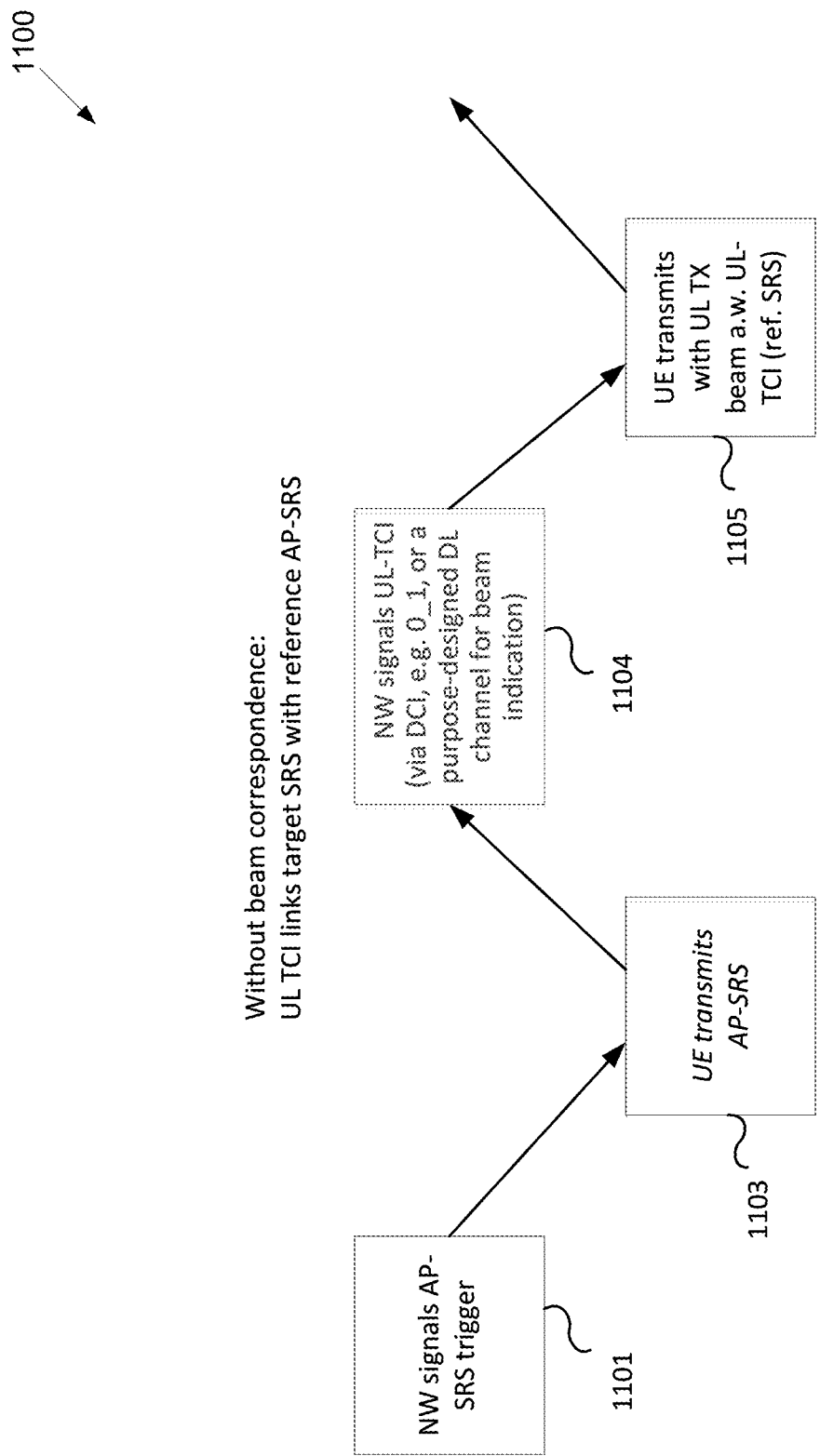
FIG. 11 illustrates another example UL multi-beam operation according to embodiments of the present disclosure.

FIG. 11 illustrates another example UL multi-beam operation 1100 according to embodiments of the present disclosure. An embodiment of the UL multi-beam operation 1100 shown in FIG. 11 is for illustration only.

In another example illustrated in FIG. 11 (embodiment B-2), an UL multi-beam operation 1100 starts with the gNB/NW signaling to a UE an aperiodic SRS (AP-SRS) trigger or request (step 1101). This trigger can be included in a DCI format, such as a DCI format scheduling a PDSCH reception or a PUSCH transmission. Upon receiving and decoding the DCI format with the AP-SRS trigger (step 1102), the UE transmits AP-SRS to the gNB/NW (step 1103) so that the NW (or gNB) can measure the UL propagation channel and select an UL TX beam for the UE.

The gNB/NW can then indicate the UL TX beam selection (step 1104) using a value of the TCI-state field in the DCI format. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding the DCI format providing a value for the TCI-state, the UE transmits, for example a PUSCH or a PUCCH, using the UL TX beam indicated by the TCI-state (step 1105).

Alternatively, a gNB/NW can indicate the UL TX beam selection (step 1104) to the UE using a value of a TCI-state field in a purpose-designed DL channel for beam indication. A purpose-designed DL channel for beam indication can be UE-specific or for a group of UEs. For example, a UE-specific DL channel can be a PDCCH that a UE receives according to a USS while a UE-group common DL channel can be a PDCCH that a UE receives according to a CSS. In this case, the UL-TCI indicates a reference RS, such as an AP-SRS, representing the selected UL TX beam. In addition, the TCI-state can also indicate a "target" RS, such as a SRS, that is linked to the reference RS, such as an AP-SRS. Upon successfully decoding a purpose-designed DL channel for beam indication through a value of the TCI-state field, the UE transmits, such as a PUSCH or a PUCCH, using the UL TX beam indicated by the value of the TCI-state (step 1105).

For this embodiment (B-2), as described above, the UE selects the UL TX beam from the reference RS (in this case SRS) index signaled via the value of the TCI-state field.

Figure 12:
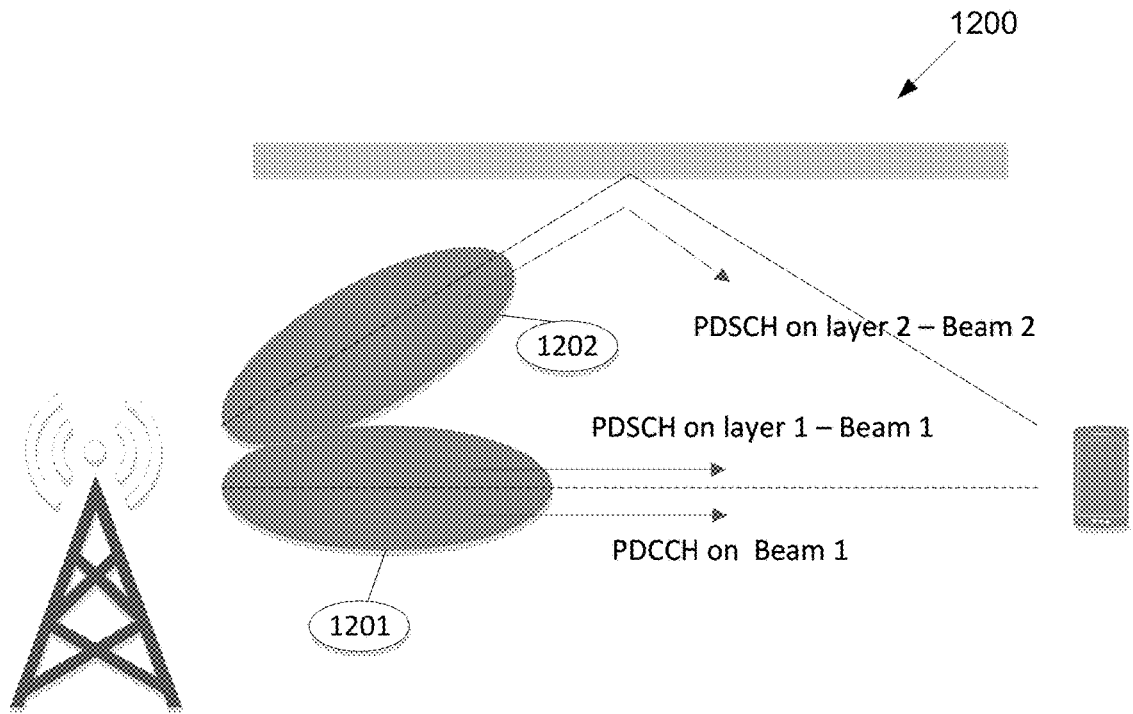
FIG. 12 illustrates an example multi-path environment with 2 RF paths according to embodiments of the present disclosure.

FIG. 12 illustrates an example multi-path environment 1200 with 2 RF paths 1200 according to embodiments of the present disclosure. An embodiment of the multi-path environment 1200 with 2 RF paths shown in FIG. 12 is for illustration only.

In a wireless communications system, under certain scenarios, more than one RF path can exist between a network and a UE. Such scenarios can arise due to the dispersive nature of the RF channel, or in a system using multi-TRP and/or multi-panel transmissions. In such scenarios, the network can exploit the multi-path environment to enhance the capacity between the network and the UE by transmitting a channel, such as a PDSCH, on multiple layers, wherein one or more layers are transmitted in a multi-path. FIG. 12 is an illustration of a multi-path environment 1200 with 2 RF paths 1201 and 1202 between a gNB and a UE.

As illustrated in FIG. 12, a gNB transmits and a UE receives a downlink data channel, such a PDSCH for 5G NR, on two layers wherein each layer is transmitted on a TX beam and received on a RX beam. Associated with the data channel (i.e., PDSCH) is a control channel (i.e., PDCCH for 5G NR). The control channel can be transmitted by the gNB on a single TX beam and received by the UE on a single RX beam. The TX beam of the control channels can be one of the TX beams for data channel and can be configured by the network using higher layer signaling, such as RRC signaling, and/or updated by the network using Layer 1 control signaling and/or a MAC CE.

In one embodiment, a beam indication in a multi-beam-channel for downlink data channels is provided. In such embodiment, a downlink data channel can be a PDSCH channel.

In one example 1.1, all the layers of the downlink data channel can be assigned a same TX beam. There is one TCI state for the downlink data channel.

In another example 1.2, each layer of a data channel can be assigned a layer-specific TX beam. In one option, one TCI state for each layer of the downlink data channel is associated with one TX beam.

In another example 1.2a, each antenna port of the DMRS of a data channel can be assigned a port-specific TX beam. In one option, one TCI state for each antenna port of the DMRS of the downlink data channel is associated with one TX beam.

In another example 1.3, a sub-set of "N" layers of a data channel can be assigned a TX beam. There is one TCI state for each "N" layers of the downlink data channel. "N" can be provided by higher layers, such as by RRC configuration. Alternatively, or additionally, "N" can be updated/indicated by a MAC CE and/or by L1 control signaling, or "N" can be specified in the system operation. The N layer indices on a TX beam can be specified, for example the indices can be consecutive, or can be indicated by RRC or/and MAC CE or/and DCI signaling either jointly or separately with the sub-set of "N" layers. For example, a value of N can be specified to be 2 and a TX beam corresponds to one CSI-RS resource with 2 antenna ports.

In another example 1.3a, a sub-set of "N" antenna ports of the DMRS of a data channel can be assigned a TX beam. There is one TCI state for each "N" antenna ports of the DMRS of the downlink data channel. "N" can be provided by higher layers, such as by RRC configuration. Alternatively, or additionally, "N" can be updated/indicated by a MAC CE and/or by L1 control signaling, or "N" can be specified in the system operation. The N antenna port indices on a TX beam can be specified, for example the indices can be consecutive, or can be indicated by RRC or/and MAC CE or/and DCI signaling either jointly or separately with the sub-set of "N" antenna ports. For example, a value of N can be specified to be 2 and a TX beam corresponds to one CSI-RS resource with 2 antenna ports.

In another example 1.4, the DL data channel is transmitted via multiple, such as 2, codewords and each codeword is assigned a TX beam. The layers of a first codeword are on a first TX beam while the layers of a second codeword are on a second TX beam. There is a first TCI state for a first codeword and a second TCI state for a second codeword.

In another example 1.5, operation following one of the examples of 1.1 to 1.4 can be indicated by RRC configuration. Alternatively, or additionally, operation following one of the examples of 1.1 to 1.4 can be updated by a MAC CE and/or L1 control signaling based on an RRC configuration (RRC configured values) or based on a specified configuration (system specified values).

In one example, a layer of the DL data channel can be associated with a DMRS port or/and a PDSCH port.

For the above embodiments, a TX beam can correspond to a reference or source RS resource, such as CSI-RS resource, SRS resource, SSB resource, or DMRS resource. Correspondence implies a quasi-colocation (QCL) relationship. The reference RS resource can include or be derived from a resource index.

The TCI state for the downlink data channel can be updated via a MAC CE or by L1 control signaling, or by a combination of the two, and can be referred to as beam indication signaling.

In another example 1.6, a UE can be configured to receive multiple layers of the DL transmission. In one example, the number of layers can at most be 2 or 4. For illustration, in the following examples, the number of layers is assumed to be at most 2. In one example, a layer corresponds to a PDSCH port.

In one example 1.6.1, a UE can receive on one or two PDSCH ports (layers) using a same beam (indicated via a single TCI state). The gNB can configure/update to the UE through RRC signaling and/or MAC CE signaling and/or L1 control signaling the number of PDSCH ports (i.e., layers) on one beam.

In another example 1.6.2, a UE can receive on one port (layer) using a first beam. The UE can receive a second layer using a second beam. The first beam is indicated via a TCI state indication, and the second beam is determined by the UE.

If a UE is configured to receive on two layers and a UE is configured to receive on one layer per beam, a UE can receive each layer on a separate beam. A UE can be signaled a first TCI state for a first beam in a beam indication message for reception of the first layer of a PDSCH channel (DL data channel). A UE can determine a second beam for reception of a second layer of a PDSCH channel according to the following instances.

In one instance, a UE reports beam reports comprising CRI (or SSBRI) and L1-RSPR/L1-SINR corresponding multiple CSI-RS s (or SSB). If the indicated TCI state associated with the first layer of PDSCH corresponds to the CRI (or SSBRI) with the m-th highest L1-RSRP/L1-SINR, the UE assumes that the second TCI state (associated with the 2nd RX beam) corresponds to the CRI with the (m+1)-th highest L1-RSRP/L1-SINR. In one example, m=1.

In another instance, if the indicated TCI state associated with the first layer of PDSCH corresponds to the CRI with the m-th highest L1-RSRP/L1-SINR and m≠1, the UE assumes that the second TCI state (associated with the 2nd RX beam) corresponds to the CRI with the highest L1-RSRP/L1-SINR (i.e., m=1).

In yet another instance, a second TCI state is configured/updated for a second beam of a second layer through RRC signaling and/or MAC-CE signaling, where the update rate for the second TCI state can be slower than the update rate for the first TCI state.

In yet another instance, a UE performs blind decoding to determine a second TCI state for a second beam to receive a second layer either. The set of candidate TCI states for the second layer can be fixed/specified in the system operation or configured (via RRC or/and MAC CE or/and DCI).

In yet another instance, a gNB configures/updates an association between a first TCI state for a first beam and a second TCI state for a second beam to a UE through RRC signaling and/or MAC CE signaling and/or L1 control signaling. When the first TCI state is signaled for a reception of a first layer of PDSCH, the associated second TCI state is used for the reception of the second layer of PDSCH.

In yet another instance, a UE recommends an association between a first TCI state for a first beam and a second TCI state for a second beam to the gNB through CSI (beam) report. When the first TCI state is signaled for a reception of a first layer of PDSCH, the associated second TCI state is used for the reception of the second layer of PDSCH.

In yet another instance, more than one instance can be specified in the system operation, the gNB configures/updates to the UE through RRC signaling and/or MAC CE signaling and/or L1 control signaling the instance to use for the reception of the layers of PDSCH.

In one embodiment, a beam indication in a multi-beam-channel for downlink control channels. In such embodiment, a downlink control channel can be a PDCCH channel.

In one example 2.1 and following example 1.1, the TCI state of the downlink control channel can follow the TCI state of the downlink data channel.

In another example 2.2 and following example 1.2, in example 2.2.1, the TCI state of the downlink control channel follows the TCI state of a fixed/specified, such as a first, layer of a downlink data channel.

In one example 2.2.1a, the TCI state of the downlink control channel is determined based on a fixed/specified rule. In one example, the rule is based on the TCI state ID. For example, the TCI state is the one with the lowest TCI state ID.

In another example 2.2.2, the TCI state of the downlink control channel follows the TCI state of a layer of the downlink data channel, wherein the index of the layer of the downlink data channel is configured through RRC signaling, and/or MAC CE signaling, and/or L1 control signaling. In one example, the index of the layer of the downlink data channel with a TCI state used for the downlink control channel is provided in the beam indication message or in the DCI format scheduling the reception of the downlink data channel. An example is illustrated in FIG. 13.

Figure 13:
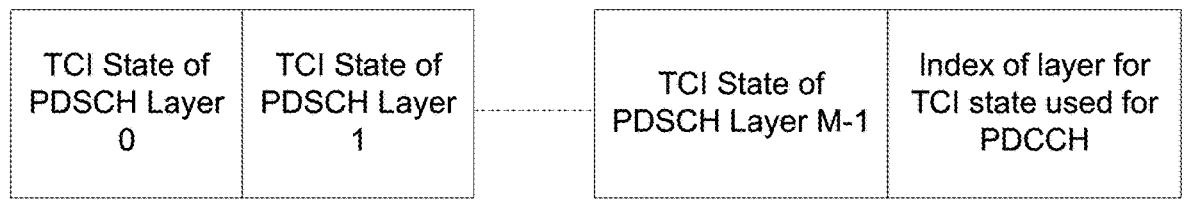
FIG. 13 illustrates an example TCI-state configuration according to embodiments of the present disclosure.

FIG. 13 illustrates an example TCI-state configuration 1300 according to embodiments of the present disclosure. An embodiment of the TCI-state configuration 1300 shown in FIG. 13 is for illustration only.

In another example 2.2.2a, the TCI state of the downlink control channel follows the TCI state of a layer of downlink data channel, wherein the index of the layer of the downlink data channel is determined based on a report from the UE, such as based on at least one beam report.

In another example 2.2.3, the downlink control channel is assigned and hence transmitted on all the TX beams (TCI states) of the downlink data channel, for example, for repetition gain or spatial diversity.

In another example 2.2.4, the downlink control channel is assigned and hence transmitted on a subset of the TX beams (TCI states) of the downlink data channel for spatial diversity. The subset of TX beams (TCI states) can be configured through RRC signaling, and/or MAC CE signaling, and/or L1 control signaling such as for example by a UE-group common PDCCH. In one example, the subset of TX beams (TCI states) is provided in the beam indication message or in the DCI format scheduling the reception of the downlink data channel. In one example, the subset of TX beams (TCI states) is fixed/specified, for example to 2.

In another example 2.2a and following example 1.2a, in example 2.2a.1, the TCI state of the downlink control channel follows the TCI state of a fixed/specified, such as a first, antenna port of the DMRS of a downlink data channel.

In another example 2.3 and following example 1.3, in one example 2.3.1, the TCI state of the downlink control channel follows the TCI state of a first group/sub-set of "N" layers of a downlink data channel.

Figure 14:
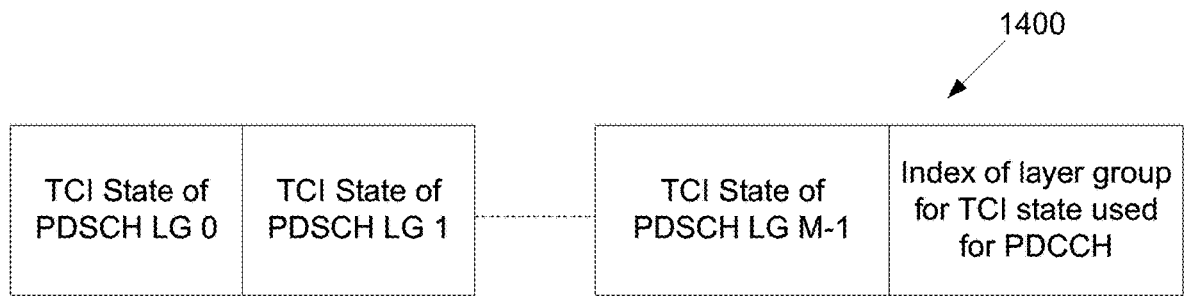
FIG. 14 illustrates another example TCI-state configuration according to embodiments of the present disclosure.

In another example 2.3.2, the TCI state of the downlink control channel follows the TCI state of a group/sub-set of "N" layers of downlink data channel, wherein the index of the group of "N" layers of the downlink data channel is configured through RRC signaling, and/or MAC CE, and/or L1 control signaling. In one example, the index of the group of "N" layers of the downlink data channel with a TCI state used for the downlink control channel is provided in the beam indication message or in the DCI format scheduling the reception of the downlink data channel. An example is illustrated in FIG. 14. In one example, "N" or/and the index of the group "N" layers is(are) fixed/specified in the system operation.

FIG. 14 illustrates another example TCI-state configuration 1400 according to embodiments of the present disclosure. An embodiment of the TCI-state configuration 1400 shown in FIG. 14 is for illustration only.

In another example 2.3.3, the downlink control channel is assigned and hence transmitted on all the TX beams (TCI states) of the downlink data channel for spatial diversity.

In another example 2.3.4, the downlink control channel is assigned and hence transmitted on a subset of the TX beams (TCI states) of the downlink data channel for spatial diversity. The subset of TX beams (TCI states) can be configured through RRC signaling, and/or MAC CE signaling, and/or L1 control signaling. In one example, the subset of TX beams (TCI states) is provided in the beam indication message or in the DCI format scheduling the reception of the downlink data channel.

In another example 2.3a and following example 1.3a, in one example 2.3a.1, the TCI state of the downlink control channel follows the TCI state of a first group/sub-set of "N" antenna ports of the DMRS of a downlink data channel.

In another example 2.4 and following example 1.4, in one example 2.4.1, the TCI state of the downlink control channel, follows the TCI state of a first codeword of a downlink data channel.

In another example 2.4.2, the TCI state of the downlink control channel follows the TCI state of a codeword of downlink data channel, wherein the index of the codeword of the downlink data channel is configured through RRC signaling, and/or MAC CE signaling, and/or L1 control signaling. In one example, the index of the codeword of the downlink data channel with a TCI state used for the downlink control channel is provided in the beam indication message or the DCI format scheduling the downlink data channel reception. An example is illustrated in FIG. 15.

Figure 15:
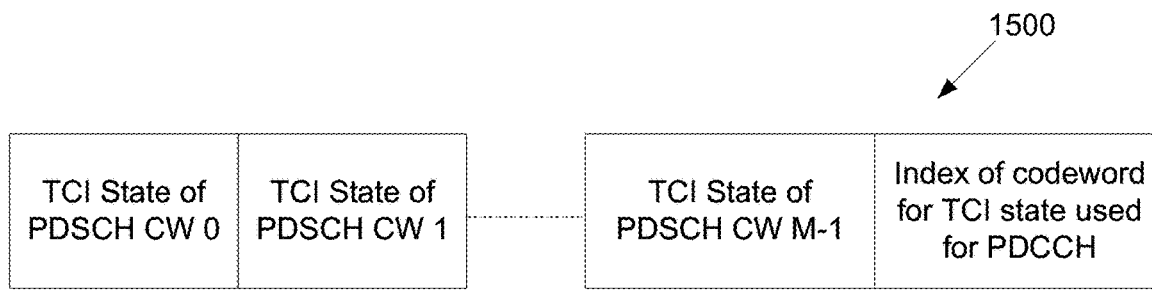
FIG. 15 illustrates yet another example TCI-state configuration according to embodiments of the present disclosure.

FIG. 15 illustrates yet another example TCI-state configuration 1500 according to embodiments of the present disclosure. An embodiment of the TCI-state configuration 1500 shown in FIG. 15 is for illustration only.

In another example 2.4.3, the downlink control channel is assigned and hence transmitted on all the TX beams (TCI states) of the downlink data channel for spatial diversity.

In another example 2.4.4, the downlink control channel is assigned and hence transmitted on a subset of the TX beams (TCI states) of the downlink data channel for spatial diversity. The subset of TX beams (TCI states) can be configured through RRC signaling, and/or MAC CE signaling, and/or L1 control signaling. In one example, the subset of TX beams (TCI states) is provided in the beam indication message or the DCI format scheduling the reception of the downlink data channel.

In another example 2.5 and following example 1.5, operation following one of the examples of 2.1 to 2.4 can be configured by RRC signaling. Alternatively, or additionally, operation following one of the examples of 2.1 to 2.4 can be updated by a MAC CE and/or L1 control signaling.

In another example 2.6, the TX beam(s) (TCI state) of the downlink control channel follows the TX beam(s) (TCI state or spatial relation) of the uplink control channel as determined in the embodiment mentioned in the present disclosure.

In another example 2.7, a CORESET can be configured with multiple TCI states that indicate corresponding QCL assumptions for receptions of DL control channels.

In another example 2.8, a search space IE can be configured with/mapped to one or more CORESETs, where a CORESET can have one or more TCI states. Wherein, the one or more TCI states are determined based on the TCI states of the layers/groups of layers/codewords/antenna ports of a downlink data channel.

In another example 2.9, a UE is not indicated or signaled a TCI state for reception of a DL control channel, from the set of TCI states configured and indicated for the DL data channel. Instead, the UE can perform multiple receiver processing functionalities, such as reception of a DL control channel and decoding of a DCI format provided by the DL control channel, with different TCI state assumptions based on the TCI states configured and indicated for the DL data channel.

In one example 2.9.1, a CORESET can be configured with multiple TCI states, from a set of TCI states configured and indicated for the downlink data channel.

In another example 2.9.2, a Search Space IE can be configured with multiple CORESETs, where a CORESET can have multiple TCI states. The multiple TCI states are determined based of the TCI states configured and indicated for the DL data channel.

In another example 2.9.3, a UE is configured with multiple search space sets, and a search space set is associated with/mapped to a CORESET that can have multiple TCI states. The multiple TCI states are determined from a set of TCI states configured and indicated the DL data channel.

For the above embodiments, a TX beam can correspond to a reference or source RS resource, such as CSI-RS resource, SRS resource, SSB resource, or DMRS resource, where correspondence implies a QCL relationship. The reference RS resource can include or be derived from a resource index. In the above example embodiments, the TCI state of the downlink control channel is updated together with the associated TCI state for the downlink data channel. That is, the TCI state signaling in examples 1.1 to example 1.6.2 corresponds to both downlink data and control channels and the updated TCI state of the downlink control channel is related to that for the downlink data channel.

In another example 2.10 and following example 1.6, a UE can be configured to receive multiple layers of the DL transmission. In one example, the number of layers can at most be 2 or 4. For illustration, in the following examples, the number of layers is assumed to be at most 2. In one example, a layer corresponds to a PDSCH DMRS antenna port. PDCCH can be received on a single layer.

If a UE is configured to receive PDSCH on two layers, and a UE is configured to receive on one layer per beam, and a UE is indicated one beam for PDSCH, a UE can determine a beam for the reception of PDCCH according to the following instances.

In one instance, the indicated TCI state for PDSCH determines the beam used for reception of PDCCH.

In another instance, a determined TCI state for PDSCH associated the highest L1-RSRP/L1-SINR determines the beam used for reception of PDCCH.

In yet another instance, a gNB configures/updates to the UE through RRC signaling and/or MAC-CE signaling, the PDSCH layer index whose TCI state is followed for PDCCH reception.

In yet another instance, a UE performs blind decoding to determine a TCI state for reception of PDCCH out of the two TCI states used for PDSCH reception.

In yet another instance, a UE receives PDCCH on two beams, for spatial diversity, following the two TCI states of PDSCH.

In yet another instance, more than one instance can be specified in the system operation, the gNB configures/updates to the UE through RRC signaling and/or MAC CE signaling and/or L1 control signaling the instance to use for the reception of PDCCH.

In one embodiment, a beam indication in a multi-beam-channel for uplink data channels is provided. In such embodiment, an uplink data channel can be a PUSCH channel.

In one example 3.1, all layers of the uplink data channel is assigned a same TX beam. There is one TCI state or spatial relation for the uplink data channel.

In another example 3.2, each layer of the uplink data channel has a layer-specific TX beam. There is one TCI state or spatial relation for each layer of the uplink data channel.

In another example 3.2a, each antenna port of a DMRS of the uplink data channel has an antenna-port-specific TX beam. There is one TCI state or spatial relation for each antenna port of the DMRS of the uplink data channel.

In another example 3.3, each sub-set of "N" layers of an uplink data channel are on a TX beam. There is one TCI state or spatial relation for each sub-set of "N" layers of the uplink data channel. The sub-set of "N" layers can be configured by RRC signaling. Alternatively, or additionally, the sub-set of "N" layers can be updated by a MAC CE and/or L1 control signaling or can be fixed/specified in the system operation. The N layer indices on a TX beam can be fixed/specified, such as consecutive layer indices, or can be configured (by RRC or/and MAC CE or/and DCI/L1 control signaling) either jointly with or separately from the sub-set of "N" layers.

In another example 3.3a, each sub-set of "N" antenna ports of a DMRS of an uplink data channel are on a TX beam. There is one TCI state or spatial relation for each sub-set of "N" antenna ports of the DMRS of the uplink data channel. The sub-set of "N" antenna ports can be configured by RRC signaling. Alternatively, or additionally, the sub-set of "N" antenna ports can be updated by a MAC CE and/or L1 control signaling or can be fixed/specified in the system operation. The N antenna port indices on a TX beam can be fixed/specified, such as consecutive antenna indices, or can be configured (by RRC or/and MAC CE or/and DCI/L1 control signaling) either jointly with or separately from the sub-set of "N" antenna ports.

In another example 3.4, the UL data channel is transmitted via multiple (e.g., 2) codewords, and each codeword is on a TX beam. The layers of a first codeword are on a first TX beam while the layers of a second codeword are on a second TX beam. There is a first TCI state or spatial relation for a first codeword and a second TCI state or spatial relation for a second codeword.

In another example 3.5, operation following one of the examples of 3.1 to 3.4 can be configured by RRC configuration, alternatively, or additionally, operation following one of the examples of 3.1 to 3.4 can be dynamically updated by a MAC CE and/or L1 control signaling. In one example, a layer of the UL data channel can be associated with a DMRS port or/and a PUSCH port.

In another example 3.6, a UE can determine an uplink TX spatial filter for transmission of an uplink channel on a beam based on a downlink RX spatial filter for reception of a downlink channel on the beam. Following the examples of example 1.1 to example 1.6.2, the uplink data channels can be transmitted on one or more Tx beams.

In one example 3.6.1, a UE transmits the uplink channel on a single TX beam. In one option, the index of the TCI state or spatial relation of the UL TX beam is based on a fixed/specified mapping to TCI states of the downlink data channel, such as the TCI state of the first layer/group of layers/codeword/antenna ports of the downlink data channel. Alternatively, the index of the TCI state or spatial relation of the TX beam is configured to be the index of the TCI state of one of the layers/groups of layers/codewords/antenna ports of the downlink data channel. The configuration can be through RRC, and/or MAC CE, and/or L1 control signaling.

In another example 3.6.2, a UE transmits the uplink channel on all beams of the downlink channel. In one option, the TCI state or spatial relation of an uplink TX beam is based on a fixed mapping between the UL layers/groups of layers/codewords/antenna ports and the downlink layers/groups of layers/codewords/antenna ports. For example, if the uplink channel is transmitted on 2 layers and the downlink channel is transmitted on 4 layers and 2 beams are configured, downlink layers 0 and 1 and uplink layer 0 are assigned to a first beam, and downlink layers 2 and 3 and uplink layer 1 are assigned to a second beam. This is illustrated by way of example in TABLE 1.

TABLE 1

Mapping all TCI states to layers of a downlink channel and to layers of an uplink channel.

| Beam (based on TCI or spatial relation) | DL Layer | UL Layer |
|---|---|---|
| TCI State 0 | DL Layer 0 | UL Layer 0 |
|  | DL Layer 1 |  |
| TCI State 1 | DL Layer 2 | UL Layer 1 |
|  | DL Layer 3 |  |

Alternatively, the TCI state or spatial relation of an uplink TX beam is based on a configuration that maps the UL layers/groups of layers/codewords/antenna ports and the downlink layers/groups of layers/codewords/antenna ports. The configuration can be through RRC, and/or MAC CE, and/or L1 control signaling.

In another example 3.6.3, a UE transmits the uplink channel on a subset of the beams of the downlink channel. In one option, the TCI state or spatial relation of an uplink TX beam is based on a fixed/specified mapping between the UL layers/groups of layers/codewords/antenna ports and a subset of the downlink layers/groups of layers/codewords/antenna ports. For example, if the uplink channel is transmitted on 2 layers and the downlink channel is transmitted on 4 layers and 4 beams are configured, downlink layer 0 and uplink layer 0 are assigned to a first beam, and downlink layer 1 and uplink layer 1 are assigned to a second beam. The remaining two downlink layers are assigned respectively to a third and fourth beams. This is illustrated by way of example in TABLE 2.

TABLE 2

Mapping all TCI states to layers of a downlink channel and a subset of TCI states to layers of an uplink channel.

| Beam (based on TCI or spatial relation) | DL Layer | UL Layer |
|---|---|---|
| TCI State 0 | DL Layer 0 | UL Layer 0 |
| TCI State 1 | DL Layer 1 | UL Layer 1 |
| TCI State 2 | DL Layer 2 |  |
| TCI State 3 | DL Layer 3 |  |

Alternatively, the TCI state or spatial relation of an uplink TX beam is based on a configuration that maps the UL layers/groups of layers/codewords/antenna ports and a subset of the downlink layers/groups of layers/codewords/antenna ports. The configuration can be through RRC, and/or MAC CE, and/or L1 control signaling.

In another example 3.6.4, a UE transmits the uplink channel on a superset of the beams of the downlink channel. In one option, the TCI state or spatial relation of an uplink TX beam is based on a fixed/specified mapping between a subset of the UL layers/groups of layers/codewords/antenna ports and the downlink layers/groups of layers/codewords/antenna ports. Additional UL layers/groups of layers/codewords/antenna ports not in the subset are configured a TCI state or spatial relation. For example, if the uplink channel is transmitted on 4 layers and the downlink channel is transmitted on 4 layers, and 2 beams are configured for the downlink channel such that, downlink layer 0 and 1 and uplink layer 0 are assigned to a first beam, and downlink layer 2 and 3 and uplink layer 1 are assigned to a second beam. The remaining two uplink layers are configured and assigned respectively to a third and fourth beam. This is illustrated by way of example in TABLE 3.

TABLE 3

Mapping a sub-set of TCI states to layers of a downlink channel and all TCI states to layers of an uplink channel.

| Beam (based on TCI or spatial relation) | DL Layer | UL Layer |
|---|---|---|
| TCI State 0 | DL Layer 0 and Layer 1 | UL Layer 0 |
| TCI State 1 | DL Layer 2 and Layer 3 | UL Layer 1 |
| TCI State 2 |  | UL Layer 2 |
| TCI State 3 |  | UL Layer 3 |

Alternatively, the TCI state or spatial relation of an uplink TX beam is based on a configuration that maps a subset of the UL layers/groups of layers/codewords/antenna ports and the downlink layers/groups of layers/codewords/antenna ports. Additional UL layers/groups of layers/codewords/antenna ports not in the subset are configured a TCI state or spatial relation through RRC, and/or MAC CE signaling, and/or L1 control signaling.

For the above embodiments, a TX beam can correspond to a reference or source RS resource, such as CSI-RS resource, SRS resource, SSB resource, or DMRS resource. Correspondence implies a QCL relationship. The reference RS resource can include or be derived from a resource index.

In another example 3.7, a UE can be configured to transmit multiple layers of the UL transmission. In one example, the number of layers can at most be 2 or 4. For illustration, in the following examples, the number of layers is assumed to be at most 2. In one example, a layer corresponds to a PUSCH port.

In one example 3.7.1, a UE, can transmit on one or two PUSCH ports (layers) using a same beam (indicated via a single TCI state/spatial relation). The gNB can configure/update to the UE through RRC signaling and/or MAC CE signaling and/or L1 control signaling the number of PUSCH ports (i.e., layers) on one beam.

In another example 3.7.2, a UE, can transmit on one port (layer) using a first beam. The UE can transmit a second layer on a second beam. The first beam is indicated via a TCI state indication, and the second beam is determined by the UE.

If a UE is configured to transmit on two layers and a UE is configured to transmit on one layer per beam, a UE can transmit each layer on a separate beam. A UE can be signaled a first TCI state/spatial relation for a first beam in a beam indication message for transmission of the first layer of a PUSCH channel (UL data channel). A UE can determine a second beam for transmission of a second layer for layer of a PUSCH channel according to the following instances.

In one instance, a UE reports beam reports comprising CRI (or SSBRI) and L1-RSPR/L1-SINR corresponding multiple CSI-RS s (or SSB). If the indicated TCI state/spatial relation is associated with the first layer of PUSCH corresponds to the CRI (or SSBRI) with the m-th highest L1-RSRP/L1-SINR, the UE assumes that the second TCI state/spatial relation (associated with the 2nd TX beam) corresponds to the CRI with the (m+1)-th highest L1-RSRP/L1-SINR. In one example, m=1

In another instance, if the indicated TCI state/spatial relation associated with the first layer of PUSCH corresponds to the CRI with the m-th highest L1-RSRP/L1-SINR and m≠1, the UE assumes that the second TCI state/spatial relation (associated with the 2nd TX beam) corresponds to the CRI with the highest L1-RSRP/L1-SINR (i.e., m=1).

In yet another instance, a second TCI state/spatial relation is configured/updated for a second beam of a second layer through RRC signaling and/or MAC-CE signaling, where the update rate for the second TCI state/spatial relation can be slower than the update rate for the first TCI state/spatial relation.

In yet another instance, a second TCI state/spatial relation is selected for a second beam to transmit a second layer. A gNB determines the second TCI state/spatial relation for a second layer of PUSCH through blind decoding. The set of candidate TCI states for the second layer can be fixed/specified in the system operation or configured (via RRC or/and MAC CE or/and DCI/L1 control signaling).

In yet another instance, a gNB configures/updates an association between a first TCI state/spatial relation for a first beam and a second TCI state/spatial relation for a second beam to a UE through RRC signaling and/or MAC CE signaling and/or L1 control signaling. When the first TCI state/spatial relation is signaled for a transmission of a first layer of PUSCH, the associated second TCI state/spatial relation is used for the transmission of the second layer of PUSCH.

In yet another instance, a gNB configures/updates an association between a first TCI state/spatial relation for a first beam and a second TCI state/spatial relation for a second beam to a UE through RRC signaling and/or MAC CE signaling and/or L1 control signaling. When the first TCI state/spatial relation is signaled for a transmission of a first layer of PUSCH, the associated second TCI state/spatial relation is used for the transmission of the second layer of PUSCH.

In yet another instance, more than one instance can be specified in the system operation, the gNB configures/updates to the UE through RRC signaling and/or MAC CE signaling and/or L1 control signaling the instance to use for the transmission of the layers of PUSCH. Either a common scheme can be used for PDSCH reception and PUSCH transmissions or separate schemes.

In one embodiment, a beam indication in a multi-beam-channel for uplink control channels is provided. In such embodiment, an uplink control channel can be a PUCCH channel.

In one example 4.1, and following example 3.1, the TCI state or spatial relation of the uplink control channel can follow the TCI state or spatial relation of the uplink data channel.

In another example 4.2 and following example 3.2, in one example 4.2.1, the TCI state or spatial relation of the uplink control channel, follows the TCI state or spatial relation of a fixed/specified layer, such as a first layer, of an uplink data channel.

In one example 4.2.1a, the TCI state of the uplink control channel is determined based on a fixed/specified rule. In one example, the rule is based on the TCI state ID or spatial relation such as the lowest TCI state ID.

In another example 4.2.2, the TCI state or spatial relation of the uplink control channel follows the TCI state or spatial relation of a layer of an uplink data channel, wherein the index of the layer of the uplink data channel is configured through RRC, and/or MAC CE, and/or L1 control signaling. In one example, the index of the layer of the uplink data channel with a TCI state or spatial relation used for the uplink control channel is provided in the beam indication message or by a DCI format scheduling a transmission of the uplink data channel. An example is illustrated in FIG. 16.

Figure 16:
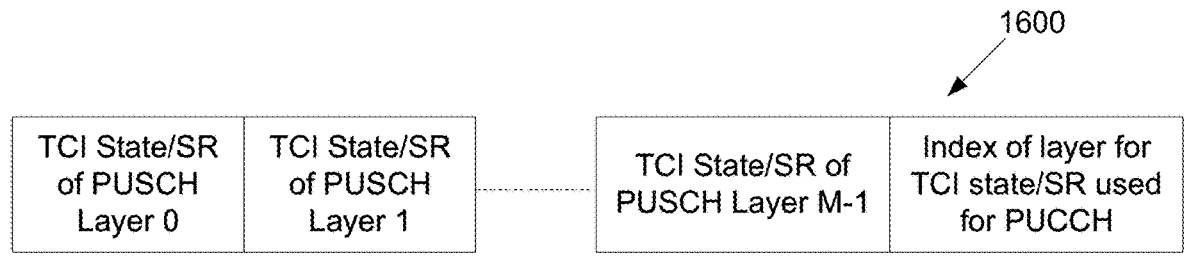
FIG. 16 illustrates yet another example TCI-state configuration according to embodiments of the present disclosure.

FIG. 16 illustrates yet another example TCI-state configuration 1600 according to embodiments of the present disclosure. An embodiment of the TCI-state configuration 1600 shown in FIG. 16 is for illustration only.

In another example 4.2.2a, the TCI state of the uplink control channel follows the TCI state or spatial relation of a layer of uplink data channel, wherein the index of the layer of the uplink data channel is determined based on a UE report, such as at least one beam report.

In another example 4.2.3, the uplink control channel is assigned and hence transmitted on all the TX beams (TCI states or spatial relations) of the uplink data channel for example for repetition gain or spatial diversity.

In another example 4.2.4, the uplink control channel is assigned and hence transmitted on a subset of the TX beams (TCI states or spatial relations) of the uplink data channel for example for repetition gain or spatial diversity. The subset of TX beams (TCI states or spatial relations) can be configured through RRC, and/or MAC CE, and/or L1 control signaling. In one example, the subset of TX beams (TCI states or spatial relations) is provided in the beam indication message or by the DCI format scheduling the uplink data channel transmission. In one example, the subset of TX beams (TCI states or spatial relation) is fixed/specified, for example to 2.

In another example 4.2a and following example 3.2a, in one example 4.2a.1, the TCI state or spatial relation of the uplink control channel, follows the TCI state or spatial relation of a fixed/specified antenna port, such as a first antenna port of the DMRS of an uplink data channel.

In another example 4.3 and following example 3.3, the following sub-examples can be further considered. In one example 4.3.1, the TCI state or spatial relation of the uplink control channel follows the TCI state or spatial relation of a first group of "N" layers of an uplink data channel.

Figure 17:
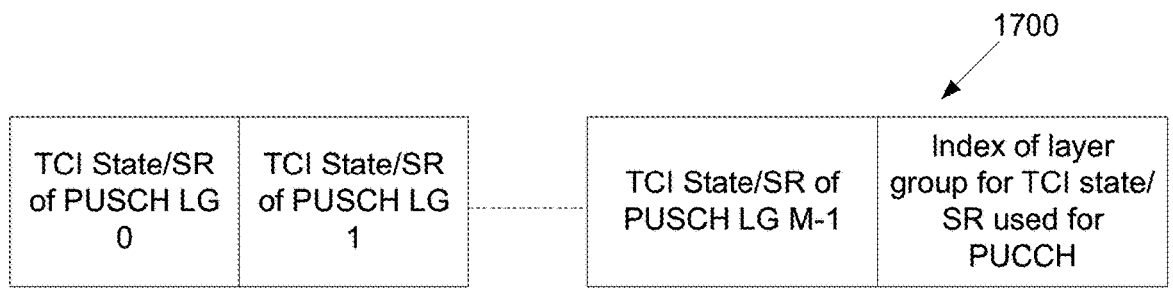
FIG. 17 illustrates yet another example TCI-state configuration according to embodiments of the present disclosure.

In another example 4.3.2, the TCI state or spatial relation of the uplink control channel follows the TCI state or spatial relation of a group of "N" layers of uplink data channel, wherein the index of the group of "N" layers of the uplink data channel is configured through RRC, and/or MAC CE, and/or L1 control signaling. In one example, the index of the group of "N" layers of the uplink data channel with a TCI state or spatial relation used for the uplink control channel is provided in the beam indication message or the DCI format scheduling the transmission of the uplink data channel. An example is illustrated in FIG. 17. In one example, "N" or/and the index of the group "N" layers is(are) fixed/specified in the system operation.

FIG. 17 illustrates yet another example TCI-state configuration 1700 according to embodiments of the present disclosure. An embodiment of the TCI-state configuration 1700 shown in FIG. 17 is for illustration only.

In another example 4.3.3, the uplink control channel is assigned and hence transmitted on all the TX beams (TCI states or spatial relation) of the uplink data channel for spatial diversity.

In another example 4.3.4, the uplink control channel is assigned and hence transmitted on a subset of the TX beams (TCI states or spatial relations) of the uplink data channel for spatial diversity, wherein the subset of TX beams (TCI states or spatial relations) can be configured through RRC, and/or MAC CE, and/or L1 control signaling. In one example, the subset of TX beams (TCI states or spatial relations) is provided in the beam indication message or by the DCI format scheduling the transmission of the uplink data channel.

In another example 4.3a and following example 3.3a, the following sub-examples can be further considered. In one example 4.3a.1, the TCI state or spatial relation of the uplink control channel follows the TCI state or spatial relation of a first group of "N" antenna ports of the DMRS of an uplink data channel.

In another example 4.4 and following example 3.4, in one example 4.4.1, the TCI state or spatial relation of the uplink control channel follows the TCI state or spatial relation of a first codeword of an uplink data channel.

In another example 4.4.2, the TCI state or spatial relation of the uplink control channel follows the TCI state or spatial relation of a codeword of uplink data channel, wherein the index of the codeword of the uplink data channel is configured by RRC, and/or MAC CE, and/or L1 control signaling. In one example, the index of the codeword of the uplink data channel whose TCI state or spatial relation is to be used for the uplink control channel is provided in the beam indication message or by the DCI format scheduling the uplink data channel transmission. An example is illustrated in FIG. 18.

Figure 18:
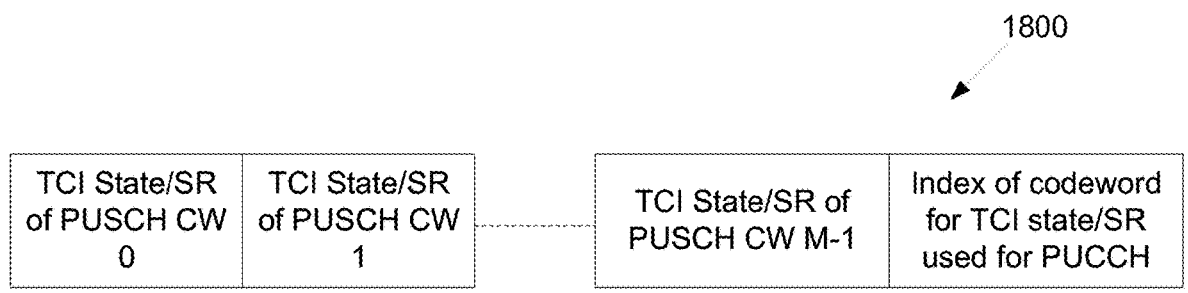
FIG. 18 illustrates yet another example TCI-state configuration according to embodiments of the present disclosure.

FIG. 18 illustrates yet another example TCI-state configuration 1800 according to embodiments of the present disclosure. An embodiment of the TCI-state configuration 1800 shown in FIG. 18 is for illustration only.

In another example 4.4.3, the uplink control channel is transmitted on all the TX beams (TCI states or spatial relations) of the uplink data channel for spatial diversity.

In another example 4.4.4, the uplink control channel is transmitted on a subset of the TX beams (TCI states or spatial relations) of the uplink data channel for spatial diversity, wherein the subset of TX beams (TCI states or spatial relations) can be configured through RRC, and/or MAC CE, and/or L1 control signaling. In one example, the subset of TX beams (TCI states or spatial relations) is provided in the beam indication message or by the DCI format scheduling the uplink data channel transmission.

In another example 4.5 and following example 3.5, an operation following one of the examples of 4.1 to 4.4 can be configured by RRC signaling. Alternatively, or additionally, operation following one of the examples of 4.1 to 4.4 can be updated by a MAC CE and/or L1 control signaling.

In another example 4.6 and following the examples 4.1 to 4.5 and the examples of example 1.1 to example 1.6.2, the TX beam(s) (TCI state or spatial relation) of the uplink control channel is determined based on the TX beam(s) (TCI state) of the downlink data channel.

In another example 4.7, the TX beam(s) (TCI state or spatial relation) of the uplink control channel follows the TX beam(s) (TCI state) of the downlink control channel as determined in examples 2.1 to 2.10.

In another example 4.8, a UE is not indicated or signaled a TCI state or spatial relation for the UL control channel from the set of TCI states or spatial relations configured and indicated for the UL or DL data channel. The UE determines a preferred TCI state or spatial relation for transmission from the set of TCI states or spatial relations configured and indicated for the UL or DL data channel. The gNB can perform multiple receiver processing functionalities, such as multiple receptions and decoding of DL control channels, with different TCI state or spatial relation assumptions based on the TCI states or spatial relations configured and indicated for the UL or DL data channel.

In another example 4.9, for an uplink control channel transmission triggered by a DCI format, the TX beam(s) (TCI state or spatial relation) of the uplink control channel is indicated by a field in the DCI format.

In another example 4.10, a configuration of each resource in set of resources for an uplink control channel transmission includes a TCI state or spatial relation. For an uplink control channel transmission triggered by a DCI format, the TX beam(s) (TCI state or spatial relation) of the uplink control channel is indicated through the indication of a resource used for the uplink control channel transmission. Wherein the TCI state or spatial relation of an uplink control channel resource is determined by a TCI state of a layer/group of layers/codeword/antenna port of a downlink or an uplink data channel.

For the above embodiments, a TX beam can correspond to a reference or source RS resource, such as CSI-RS resource, SRS resource, SSB resource, or DMRS resource. Correspondence implies a QCL relationship. The reference RS resource therein can include or be derived from a resource index.

In another example 4.11 and following example 1.6, a UE can be configured to transmit/receive on multiple layers of UL/DL transmissions. In one example, the number of layers can at most be 2 or 4. For illustration, in the following examples, the number of layers is assumed to be at most 2. In one example, a layer corresponds to a PDSCH port. PUCCH can be transmitted on a single layer.

If a UE is configured to receive PDSCH on two layers, and a UE is configured to transmit/receive on one layer per beam, and a UE is indicated one beam for PDSCH, a UE can determine a beam for the transmission of PUCCH according to the following instances.

In one instance, the indicated TCI state for PDSCH determines the beam used for transmission of PUCCH.

In another instance, a determined TCI state for PDSCH associated the highest L1-RSRP/L1-SINR determines the beam used for transmission of PUCCH.

In yet another instance, a gNB configures/updates to the UE through RRC signaling and/or MAC-CE signaling, the PDSCH layer index whose TCI state is followed for PUCCH transmission.

In yet another instance, a UE selects a TCI state for transmission of PUCCH out of the two TCI states used for PDSCH reception. A gNB determines the PUCCH TCI state through blind decoding.

In yet another instance, a UE determines a TCI state for transmission of PUCCH based on the TCI state used for the reception of PDCCH.

In yet another instance, a UE transmits PUCCH on two beams, for spatial diversity, following the two TCI states of PDSCH.

In yet another instance, more than one instance can be specified in the system operation, the gNB configures/updates to the UE through RRC signaling and/or MAC CE signaling and/or L1 control signaling the instance to use for the transmission of PUCCH.

In another example 4.12 and following example 3.7, a UE can be configured to transmit on multiple layers of UL transmissions. In one example, the number of layers can at most be 2 or 4. For illustration, in the following examples, the number of layers is assumed to be at most 2. In one example, a layer corresponds to a PUSCH port. PUCCH can be transmitted on a single layer.

If a UE is configured to transmit PUSCH on two layers, and a UE is configured to transmit on one layer per beam, and a UE is indicated one beam for PUSCH, a UE can determine a beam for the transmission of PUCCH according to the following instances.

In one instance, the indicated TCI state/spatial relation for PUSCH determines the beam used for transmission of PUCCH.

In another instance, a determined TCI state/spatial for PUSCH associated the highest RSRP/SINR determines the beam used for transmission of PUCCH.

In yet another instance, a gNB configures/updates to the UE through RRC signaling and/or MAC-CE signaling, the PUSCH layer index whose TCI state/spatial relation is followed for PUCCH transmission.

In yet another instance, a UE selects a TCI state/spatial relation for transmission of PUCCH out of the two TCI states/spatial relation used for PUSCH transmission. A gNB determines the PUCCH TCI state/spatial relation through blind decoding.

In yet another instance, a UE transmits PUCCH on two beams, for spatial diversity, following the two TCI states/spatial relations of PUSCH.

In yet another instance, more than one instance of example 4.12 can be specified in the system operation, the gNB configures/updates to the UE through RRC signaling and/or MAC CE signaling and/or L1 control signaling the instance to use for the transmission PUCCH.

In yet another instance, more than one instance of example 4.11 and example 4.12 can be specified in the system operation, the gNB configures/updates to the UE through RRC signaling and/or MAC CE signaling and/or L1 control signaling the instance to use for the transmission of PUCCH.

In one embodiment, a beam indication in a multi-beam-channel with multiple component carriers is provided.

A common/joint beam indication can be used to signal/indicate TX beam in multiple component carriers. The component carriers can have different number of layers for the data channels and/or different number of TX beams. The following examples can apply to DL and/or UL data channels and/or control channels. The following examples illustrate the case of two component carriers/cells; however, the two component carriers/cells can be extended to multiple component carriers/cells. In the following examples, carrier A is a first component carrier/cell and carrier B is a second component carrier/cell.

In one example 5.1, a gNB or UE transmits a first channel on multiple TX beams in carrier A, and transmits a second channel on a single TX beam on carrier B. In one option, the index of the TCI state or spatial relation of the TX beam of the second channel on carrier B is based on a fixed/specified mapping to TCI states or spatial relation of the first channel on carrier A, such as for example, the TCI state of the first layer/group of layers/codeword/antenna port of the first channel on carrier A. Alternatively, the index of the TCI state can be based on a rule of the TCI states of the layers/groups of layers/codewords/antenna ports of the first channel on carrier A, for the example the rule can be the smallest TCI state index. Alternatively, the index of the TCI state or spatial relation of the TX beam of the second channel on carrier B is configured to be one of the TCI states or spatial relation of the layers/groups of layers/codewords/antenna ports of the first channel on carrier A, wherein the configuration can be through RRC, and/or MAC CE, and/or L1 control signaling.

In another example 5.2, a gNB or UE transmits a first channel on multiple TX beams on carrier A and transmits a second channel on carrier B on all beams of carrier A. In one option, the TCI state or spatial relation of a TX Beam of the second channel carrier B is based on a fixed/specified mapping between the layers/groups of layers/codewords/antenna ports of the channel on carrier B and the layers/groups of layers/codewords/antenna ports of carrier A. For example, if a channel on carrier B is transmitted on 2 layers and a channel on carrier A is transmitted on 4 layers, and 2 beams are configured then on carrier A, layers 0 and 1 are assigned to a first beam and layers 2 and 3 are assigned to a second beam while on carrier B, layer 0 is assigned to a first beam and layer 1 is assigned to a second beam. This is illustrated by way of example in TABLE 4.

TABLE 4

Assignment of TCI states to a channel per carrier for transmission with different layers per carrier when a number of TCI states is not larger than a number of layers on any carrier.

| Beam (based on TCI or spatial relation) | Carrier A Layer | Carrier B Layer |
|---|---|---|
| TCI State 0 | Carrier A Layer 0 | Carrier B Layer 0 |
| | Carrier A Layer 1 | |
| TCI State 1 | Carrier A Layer 2 | Carrier B Layer 1 |
| | Carrier A Layer 3 | |

Alternatively, the TCI state or spatial relation of carrier B TX beam is based on a configuration that maps the layers/groups of layers/codewords/antenna ports of carrier B and the layers/groups of layers/codewords/antenna ports of carrier A, wherein the configuration can be through RRC, and/or MAC CE, and/or L1 control signaling.

In another example 5.3, a gNB or a UE transmits a first channel on multiple TX beams on carrier A and transmits a second channel on carrier B on a subset of the beams of carrier A. In one option, the TCI state or spatial relation of a TX Beam on carrier B is based on a fixed mapping between the layers/groups of layers/codewords/antenna ports of carrier B and a subset of the layers/groups of layers/codewords/antenna ports of carrier A. For example, if a channel on carrier B is transmitted on 2 layers and a channel on carrier A is transmitted on 4 layers, and with 4 beams configured, carrier A layer 0 and carrier B layer 0 are assigned to a first beam, and carrier A layer 1 and carrier B layer 1 are assigned to a second beam. The remaining two carrier A layers are assigned respectively to a third and fourth beam. This is illustrated by way of example in TABLE 5.

TABLE 5

Assignment of TCI states to a channel per carrier for transmission with different layers per carrier when a number of TCI states is larger than a number of layers on a carrier.

| Beam (based on TCI or spatial relation) | Carrier A Layer | Carrier B Layer |
| --- | --- | --- |
| TCI State 0 | Carrier A Layer 0 | Carrier B Layer 0 |
| TCI State 1 | Carrier A Layer 1 | Carrier B Layer 1 |
| TCI State 2 | Carrier A Layer 2 | |
| TCI State 3 | Carrier A Layer 3 | |

Alternatively, the TCI state or spatial relation of a TX beam on carrier B is based on a configuration that maps the layers/groups of layers/codewords/antenna ports of carrier B and a subset of the layers/groups of layers/codewords/antenna ports of carrier A, wherein the configuration can be through RRC, and/or MAC CE, and/or L1 control signaling.

In another example 5.4, a gNB or UE transmits a first channel on one or multiple TX beams on carrier A and transmits a second channel on carrier B on a superset of the beams of carrier A. In one option, the TCI state or spatial relation of a TX beam on carrier B is based on a fixed mapping between a subset of the layers/groups of layers/codewords/antenna ports of carrier B and the layers/groups of layers/codewords/antenna ports of carrier A. Additional layers/groups of layers/codewords/antenna ports of carrier B not in the subset are configured a TCI state or spatial relation. For example, if a first channel on carrier A is transmitted on 4 layers and a second channel on carrier B is transmitted on 4 layers, and 2 beams are configured on carrier A then, carrier A layer 0 and 1 and carrier B layer 0 are assigned to a first beam, and carrier A layer 2 and 3 and carrier B layer 1 are assigned to a second beam. The remaining two carrier B layers are configured and assigned respectively to a third and fourth beams. This is illustrated by way of example in TABLE 6.

TABLE 6

Assignment of TCI states to a channel per carrier for transmission with different number of layers per TCI state per carrier.

| Beam (based on TCI or spatial relation) | Carrier A Layer | Carrier B Layer |
| --- | --- | --- |
| TCI State 0 | Carrier A Layer 0 and Layer 1 | Carrier B Layer 0 |
| TCI State 1 | Carrier A Layer 2 and Layer 3 | Carrier B Layer 1 |
| TCI State 2 | | Carrier B Layer 2 |
| TCI State 3 | | Carrier B Layer 3 |

Alternatively, the TCI state or spatial relation of a TX Beam on carrier B is based on a configuration that maps a subset of the UL layers/groups of layers/codewords/antenna ports of carrier B and the layers/groups of layers/codewords/antenna ports of carrier A. Additional carrier B layers/groups of layers/codewords/antenna ports not in the subset are configured a TCI state or spatial relation wherein the configurations can be through RRC, and/or MAC CE, and/or L1 control signaling.

In another example 5.5, a gNB or UE transmits a first channel on one or multiple TX beams on carrier A and transmits a second channel on one or multiple TX beams on carrier B, where a first subset "A" of TX beams are only configured for carrier A. A second subset "B" of TX beams are only configured for carrier B. A third subset "C" of TX beam are jointly configured for carriers A and B. The number of elements in any of the subsets "A," "B," and "C", can be zero, one, or more than one.

For the above embodiments, a TX beam can correspond to a reference or source RS resource, such as CSI-RS resource, SRS resource, SSB resource, or DMRS resource. Correspondence implies a QCL relationship. The reference RS resource therein can include or be derived from a resource index.

In another example 5.6, a UE can be configured to transmit/receive on multiple layers in a first carrier and can be configured to transmit/receive on one layer in a second carrier. In one example, the number of layers can at most be 2 or 4. For illustration, in the following examples, the number of layers is assumed to be at most 2. In one example, a layer corresponds to a PDSCH port or a PUSCH port.

If a UE is configured to transmit/receive on two layers on a first carrier, and a UE is configured to transmit/receive on one layer per beam, and a UE is indicated one beam for transmission/reception for a first carrier, a UE can determine a beam for transmission/reception for a second carrier according to the following instances.

In one instance, the indicated TCI state/spatial relation for transmission/reception on a first carrier determines the beam used for transmission/reception on a second carrier.

In another instance, a determined TCI state/spatial relation for transmission/reception on a first carrier associated the highest L1-RSRP/L1-SINR determines the beam used for transmission/reception on a second carrier.

In yet another instance, a gNB configures/updates to the UE through RRC signaling and/or MAC-CE signaling, the first carrier layer index whose TCI state/spatial relation is followed for the second carrier.

In yet another instance, a UE performs blind decoding to determine a TCI state for reception on a second carrier out of the two TCI states/spatial relations used for transmission/reception on a first carrier.

In yet another instance, a UE selects a TCI state/spatial relation for transmission on a second carrier out of the two TCI states/spatial relations used for transmission/reception on a first carrier. A gNB determines the TCI state/spatial relation of a second carrier through blind decoding.

In yet another instance, a UE transmits/receives on second carrier on two beams, for spatial diversity, following the two TCI states/relations for transmission/reception on a first carrier.

In yet another instance, more than one instance can be specified in the system operation, the gNB configures/updates to the UE through RRC signaling and/or MAC CE signaling and/or L1 control signaling the instance to use for the transmission/reception on a second carrier.

For illustrative purposes the steps of this algorithm are described serially, however, some of these steps may be performed in parallel to each other. The above operation diagrams illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A method performed by a user equipment (UE) in a wireless communication system, the method comprising:
   receiving configuration information for transmission configuration indication (TCI) states;
   receiving a media access control (MAC) control element (CE) indicating a subset of the TCI states;
   receiving downlink control information (DCI) indicating a TCI state selection;
   in case that two TCI states are indicated from the subset by at least one of the MAC CE and DCI, determining, according to the TCI state selection, whether to apply one of the two TCI states to all antenna ports for a physical downlink shared channel (PDSCH), or to apply the two TCI states respectively to two sub-groups of antenna ports for the PDSCH; and
   receiving the PDSCH based on the determination.

2. The method of claim 1, wherein the DCI indicates the TCI state selection based on a radio resource control (RRC) configuration.

3. The method of claim 1, wherein the DCI includes a TCI field and a codepoint of the TCI field is associated with the subset.

4. The method of claim 1, wherein the DCI schedules the PDSCH.

5. A user equipment (UE) comprising:
   a transceiver configured to:
      receive configuration information for transmission configuration indication (TCI) states,
      receive a media access control (MAC) control element (CE) indicating a subset of the TCI states, and
      receive downlink control information (DCI) indicating a TCI state selection; and
   a processor operably coupled to the transceiver, the processor configured, in case that two TCI states are indicated from the subset by at least one of the MAC CE and DCI, to determine, according to the TCI state selection, whether to apply one of the two TCI states to all antenna ports for a physical downlink shared channel (PDSCH), or to apply the two TCI states respectively to two sub-groups of antenna ports for the PDSCH,
   wherein the transceiver is further configured to receive the PDSCH based on the determination.

6. The UE of claim 5, wherein the DCI indicates the TCI state selection based on a radio resource control (RRC) configuration.

7. The UE of claim 5, wherein the DCI includes a TCI field and a codepoint of the TCI field is associated with the subset.

8. The UE of claim 5, wherein the DCI schedules the PDSCH.

9. A base station (BS) comprising:
   a transceiver configured to:
      transmit configuration information for transmission configuration indication (TCI) states,
      transmit a media access control (MAC) control element (CE) indicating a subset of the TCI states, and
      transmit downlink control information (DCI) indicating a TCI state selection; and
   a processor operably coupled to the transceiver, the processor configured to determine, according to the TCI state selection, whether to apply one TCI state of the subset to all antenna ports for a physical downlink shared channel (PDSCH), or to apply different TCI states of the subset to different sub-groups of antenna ports for the PDSCH, respectively,
   wherein the transceiver is further configured to transmit the PDSCH based on the determination.

10. The BS of claim 9, wherein the DCI indicates the TCI state selection based on a radio resource control (RRC) configuration.

11. The BS of claim 9, wherein the DCI includes a TCI field and a codepoint of the TCI field is associated with the subset.

12. The BS of claim 9, wherein the DCI schedules the PDSCH.

* * * * *